US010897764B2

(12) United States Patent
Bhattad et al.

(10) Patent No.: US 10,897,764 B2
(45) Date of Patent: Jan. 19, 2021

(54) RADIO-UNLICENSED (NR-U) INTERLACE-BASED RESOURCE ALLOCATIONS

(71) Applicant: QUALCOMM Incorporated, San Diego, CA (US)

(72) Inventors: Kapil Bhattad, Bangalore (IN); Ananta Narayanan Thyagarajan, Bangalore (IN); Xiaoxia Zhang, San Diego, CA (US); Jing Sun, San Diego, CA (US); Tamer Kadous, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/269,992

(22) Filed: Feb. 7, 2019

(65) Prior Publication Data
US 2019/0268907 A1    Aug. 29, 2019

(30) Foreign Application Priority Data

Feb. 23, 2018   (IN) .............................. 201841006937

(51) Int. Cl.
*H04W 72/04* (2009.01)
*H04W 52/36* (2009.01)
*H04W 16/14* (2009.01)

(52) U.S. Cl.
CPC ....... *H04W 72/0453* (2013.01); *H04W 52/36* (2013.01); *H04W 72/042* (2013.01); *H04W 16/14* (2013.01)

(58) Field of Classification Search
CPC .............. H04W 52/36; H04W 72/042; H04W 72/0453
See application file for complete search history.

(56) References Cited

U.S. PATENT DOCUMENTS

2017/0289967 A1* 10/2017 Yu .......................... H04L 5/0037
2018/0124790 A1*  5/2018 Yerramalli ........ H04W 72/0453
(Continued)

FOREIGN PATENT DOCUMENTS

WO     2017099659 A1     6/2017

OTHER PUBLICATIONS

Waveform Options Under PSD limitation. 3GPP TSG RAN WG1 Meeting #92 R1-1802869. Mar. 2, 2018 (Year: 2018).*
(Continued)

*Primary Examiner* — Kashif Siddiqui
(74) *Attorney, Agent, or Firm* — Haynes and Boone, LLP

(57) ABSTRACT

Wireless communications systems and methods related to scheduling and communicating in a frequency spectrum using interlaced frequency resources are provided. A first wireless communication device communicates, with a second wireless communication device, a first interlace configuration indicating a first set of interlaced frequency resources in a frequency band based on a power spectral density (PSD) parameter. The first wireless communication device communicates, with the second wireless communication device, a first frequency resource exclusion configuration. The first wireless communication device communicates, with the second wireless communication device, a first allocation including at least some frequency resources from the first set of interlaced frequency resources based on the first frequency resource exclusion configuration. The first wireless communication device communicates, with the second wireless communication device, a first communication signal based on the first allocation.

30 Claims, 14 Drawing Sheets

(56) References Cited

U.S. PATENT DOCUMENTS

| | | | |
|---|---|---|---|
| 2019/0013905 A1* | 1/2019 | Yang | H04L 5/003 |
| 2019/0116615 A1* | 4/2019 | Harada | H04W 74/0808 |
| 2020/0059961 A1* | 2/2020 | Do | H04W 16/14 |
| 2020/0137780 A1* | 4/2020 | Kim | H04L 5/0094 |

OTHER PUBLICATIONS

Ericsson: "Numerology for NR Operation in Unlicensed Spectrum", 3GPP Draft, R1-1802781 Numerology for NR Operation in Unlicensed Spectrum, 3rd Generation Partnership Project (3GPP), Mobile Competence Centre, 650, Route Des Lucioles, F-06921 Sophia-Antipolis Cede, vol. RAN WG1, No. Athens, Greece, Feb. 26, 2018-Mar. 2, 2018, Feb. 17, 2018 (Feb. 17, 2018), XP051398213, 3 Pages, Retrieved from the Internet: URL:http://www.3gpp.org/ftp/tsg%5Fran/WG1%5FRL1/TSGR1%5F92/Docs/ [retrieved on Feb. 17, 2018].

International Search Report and Written Opinion—PCT/US2019/017252—ISA/EPO—dated Apr. 29, 2019.

Qualcomm Incorporated: "Waveform Options Under PSD limitation", 3GPP Draft, R1-1802869 7.6.5 WAVEFORMUNDERPSDSUB6, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 26, 2018-Mar. 2, 2018, Feb. 17, 2018 (Feb. 17, 2018), XP051398282, 12 Pages, Retrieved from the Internet:URL:http://www.3gpp.org/ftp/tsg%5Fran/WG1%5FRL1/TSGR1%5F92/Docs/ [retrieved on Feb. 17, 2018], Sections 3 and 4.

* cited by examiner

RADIO-UNLICENSED (NR-U) INTERLACE-BASED RESOURCE ALLOCATIONS

CROSS REFERENCE TO RELATED APPLICATIONS

The present application claims priority to and the benefit of India Patent Application No. 201841006937, filed Feb. 23, 2018, which is hereby incorporated by reference in its entirety as if fully set forth below and for all applicable purposes.

TECHNICAL FIELD

This application relates to wireless communication systems, and more particularly to communicating in a frequency spectrum using interlaced frequency resources.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the LTE technology to a next generation new radio (NR) technology. NR may provision for dynamic medium sharing among network operators in a licensed spectrum, a shared spectrum, and/or an unlicensed spectrum. For example, shared spectrums and/or unlicensed spectrums may include frequency bands at about 3.5 gigahertz (GHz), about 6 GHz, and about 60 GHz.

Certain unlicensed bands may have regulatory limits on the maximum transmit power, the total transmit power, and/or the maximum power spectral density (PSD) that a transmitter may transmit in the frequency band since nodes or communication device using various wireless communication protocols may coexist. PSD requirements are commonly defined in terms of a maximum transmission power within a frequency bandwidth of about 1 megahertz (MHz). For example, a certain frequency band may have a PSD limit of about 10 decibel milliwatts per megahertz (dBm/MHz). Thus, a transmission in any 1 MHz bandwidth within the frequency band may not exceed 10 dBm. As such, resource allocations that take PSD requirements into account may be useful for communicating in a frequency spectrum including a PSD limit.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication including communicating, by a first wireless communication device with a second wireless communication device, a first interlace configuration indicating a first set of interlaced frequency resources in a frequency band based on a power spectral density (PSD) parameter; communicating, by the first wireless communication device with the second wireless communication device, a first frequency resource exclusion configuration; communicating, by the first wireless communication device with the second wireless communication device, a first allocation including at least some frequency resources from the first set of interlaced frequency resources based on the first frequency resource exclusion configuration; and communicating, by the first wireless communication device with the second wireless communication device, a first communication signal based on the first allocation.

In an additional aspect of the disclosure, an apparatus including a transceiver configured to communicate, with a second wireless communication device, a first interlace configuration indicating a first set of interlaced frequency resources in a frequency band based on a power spectral density (PSD) parameter; communicate, with the second wireless communication device, a first frequency resource exclusion configuration; communicate, with the second wireless communication device, a first allocation including at least some frequency resources from the first set of interlaced frequency resources based on the first frequency resource exclusion configuration; and communicate, with the second wireless communication device, a first communication signal based on the first allocation.

In an additional aspect of the disclosure, a computer-readable medium having program code recorded thereon, the program code comprising code for causing a first wireless communication device to communicate, with a second wireless communication device, a first interlace configuration indicating a first set of interlaced frequency resources in a frequency band based on a power spectral density (PSD) parameter; code for causing the first wireless communication device to communicate, with the second wireless communication device, a first frequency resource exclusion configuration; code for causing the first wireless communication device to communicate, with the second wireless communication device, a first allocation including at least some frequency resources from the first set of interlaced frequency resources based on the first frequency resource exclusion configuration; and code for causing the first wireless communication device to communicate, with the second wireless communication device, a first communication signal based on the first allocation.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
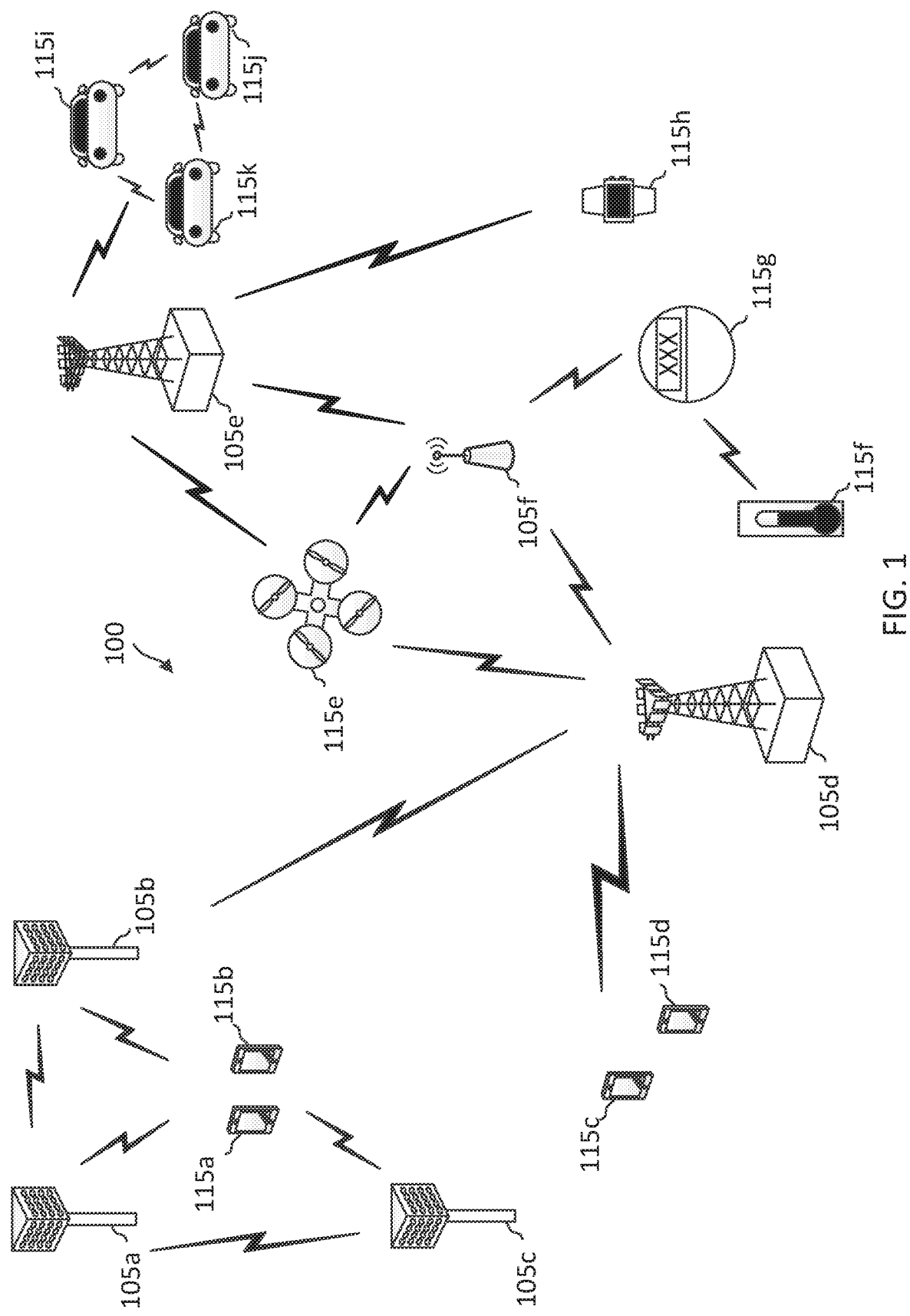
FIG. 1 illustrates a wireless communication network according to some embodiments of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a ULtra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

Regulatory authorities may regulate the amount of transmission power that is allowed in certain frequency bands to ensure limited interference across communication devices or nodes sharing the frequency bands. For example, a certain frequency band may allow a maximum power spectral density (PSD) of about 10 decibel milliwatts per megahertz (dBm/MHz) for any transmission in the frequency band. However, a transmitter may be capable of transmitting at a higher power. One approach to allowing for a higher total transmit power while meeting a PSD requirement is to spread the frequency occupancy of a transmission signal over a wider bandwidth. For example, in enhanced Licensed Assisted Access (eLAA), a UE may be allocated with dis-contiguous blocks of frequencies within a bandwidth, where adjacent frequency blocks are separated by more than 1 MHz to allow the UE to transmit at a higher power up to the PSD limit (e.g., at about 10 dBm) in each frequency block.

The present application describes mechanisms for communicating in a frequency spectrum using frequency interlaced-based resources. For example, a frequency band may be partitioned into multiple sets of interlaced frequency resources. A transmission signal may be transmitted using a set of interlaced frequency resources spaced apart from each other and interlaced with another set of interlaced frequency resources. The distribution of the transmission signal in a frequency domain can reduce the transmit PSD of the signal. Each set of interlaced frequency resources may be referred to as a frequency interlace. In the disclosed embodiments, a BS may configure interlaced frequency resources in a frequency band. The configuration may include determining a number of frequency interlaces in the frequency band, an interlace-spacing (e.g., the frequency separation among interlaced frequency resources within a frequency interlace), and/or a frequency interlace size (e.g., the number of interlaced frequency resources within a frequency interlace). The BS may allocate resources in units of frequency interlaces.

In an embodiment, a frequency band may be configured with frequency interlaces of equal sizes in a frequency band. In some other embodiments, a frequency band may be configured with frequency interlaces of multiple sizes. An allocation may include one or more frequency interlaces, for example, depending on an allocation capacity requirement or a UE capability. Some frequency resources may be excluded from an allocation to meet a frequency interlace size constraint and/or a uniform frequency distribution constraint.

In an embodiment, a frequency band may be configured with frequency interlaces of different subcarrier spacings (SCSs) based on a hierarchical tree structure, where a frequency interlace of a higher SCS (e.g., of about 30 kHz) may be configured by combining a number of frequency interlaces of a lower SCS (e.g., of about 15 kHz). The different SCS configurations may have the same interlace-spacing or the same number of frequency interlaces. In some embodiments, certain frequency resources may be excluded to align frequency interlaces of different SCSs and/or to meet various constraints. In some other embodiments, a frequency band may be configured with frequency interlaces of different subcarrier spacings (SCSs) by maintaining the same frequency interlace structure across the different SCS configurations. A BS may schedule one UE with a first frequency interlace of a higher SCS and another with a second frequency interlace of a lower SCS in the same time period.

In some embodiments, a BS may broadcast frequency interlace configurations and/or frequency resource exclusion rules in a network to facilitate resource scheduling in the network.

FIG. 1 illustrates a wireless communication network 100 according to some embodiments of the present disclosure. The network 100 may be a 5G network. The network 100 includes a number of base stations (BSs) 105 and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of 3 dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as internet of everything (IoE) devices. The UEs 115a-115d are examples of mobile smart phone-type devices accessing network 100 A UE 115 may also be a machine specifically configured for connected communication, including machine type communication (MTC), enhanced MTC (eMTC), narrowband IoT (NB-IoT) and the like. The UEs 115e-115k are examples of various machines configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink and/or uplink, or desired transmission between BSs, and backhaul transmissions between BSs.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-hop configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as in a vehicle-to-vehicle (V2V)

In some implementations, the network 100 utilizes OFDM-based waveforms for communications. An OFDM-based system may partition the system bandwidth into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system bandwidth. The system bandwidth may also be partitioned into subbands. In other instances, the subcarrier spacing and/or the duration of TTIs may be scalable.

In an embodiment, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes, for example, about 10. Each subframe can be divided into slots, for example, about 2. Each slot may be further divided into mini-slots. In a frequency-division duplexing (FDD) mode, simultaneous UL and DL transmissions may occur in different frequency bands. For example, each subframe includes a UL subframe in a UL frequency band and a DL subframe in a DL frequency band. In a time-division duplexing (TDD) mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational bandwidth or frequency band, each positioned at a pre-defined time and a pre-defined frequency. For example, a BS 105 may transmit cell specific reference signals (CRSs) and/or channel state information-reference signals (CSI-RSs) to enable a UE 115 to estimate a DL channel. Similarly, a UE 115 may transmit sounding reference signals (SRSs) to enable a BS 105 to estimate a UL channel Control information may include resource assignments and protocol controls. Data may include protocol data and/or operational data. In some embodiments, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than UL communication. A UL-centric subframe may include a longer duration for UL communication than UL communication.

In an embodiment, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining minimum system information (RMSI), and other system information (OSI)) to facilitate initial network access. In some instances, the BSs 105 may broadcast the PSS, the SSS, the MIB, the RMSI, and/or the OSI in the form of synchronization signal blocks (SSBs).

In an embodiment, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The SSS may also enable detection of a duplexing mode and a cyclic prefix length. Some systems, such as TDD systems, may transmit an SSS but not a PSS. Both the PSS and the SSS may be located in a central portion of a carrier, respectively.

After receiving the PSS and SSS, the UE 115 may receive a MIB, which may be transmitted in the physical broadcast channel (PBCH). The MIB may include system information for initial network access and scheduling information for RMSI and/or OSI. After decoding the MIB, the UE 115 may receive RMSI and/or OSI. The RMSI and/or OSI may include radio resource configuration (RRC) configuration information related to random access channel (RACH) procedures, paging, physical uplink control channel (PUCCH), physical uplink shared channel (PUSCH), power control, SRS, and cell barring. After obtaining the MIB, the RMSI and/or the OSI, the UE 115 can perform a random access procedure to establish a connection with the BS 105. After establishing a connection, the UE 115 and the BS 105 can enter a normal operation stage, where operational data may be exchanged.

In an embodiment, the network 100 may operate over a frequency spectrum including a PSD requirement, limit, or constraint. A PSD requirement may include a maximum transmit PSD level, a range of allowable transmit PSD levels, a target transmit PSD level, and/or a power utilization factor of a transmitter. To meet the PSD requirement, a transmitter (e.g., the BSs 105 and the UEs 115) may spread a transmission signal over a wider bandwidth. For example, a transmitter may transmit a signal over multiple narrow frequency bands spaced apart from each other in a frequency bandwidth at a higher power than transmitting the signal over contiguous frequencies. In an embodiment, a BS 105 may allocate resources in units of frequency interlaces. For example, the frequency spectrum may be divided into multiple frequency interlaces. Each frequency interlace may include a set of frequency resources or interlace elements spaced apart from each other by frequency resources of another frequency interlace.

The frequency interlaces can be of equal sizes (e.g., including the same number of frequency resources) or different sizes (e.g., including different number of frequency resources). The frequency interlaces can be based on the same SCS or different SCSs. For example, a BS 105 may communicate with one UE 115 using one frequency interlace of a first SCS and communicate with another UE 115 using another frequency interlace of a second, different SCS. In addition, the BS 105 may communicate with one UE 115 using an OFDM waveform and communicate with another UE 115 using a discrete Fourier transform-spread-OFDM (DFT-s-OFDM) waveform (e.g., single carrier-frequency division multiplexing (SC-FDM)).

In some embodiments, a BS 105 may configure a UE 115 with certain rules for excluding or dropping certain frequency resources from a frequency interlace for communications to meet a certain frequency interlace size constraint or a certain frequency interlace pattern. Mechanisms for configuring frequency interlaces and communicating using frequency interlaces are described in greater detail herein.

Figure 2:
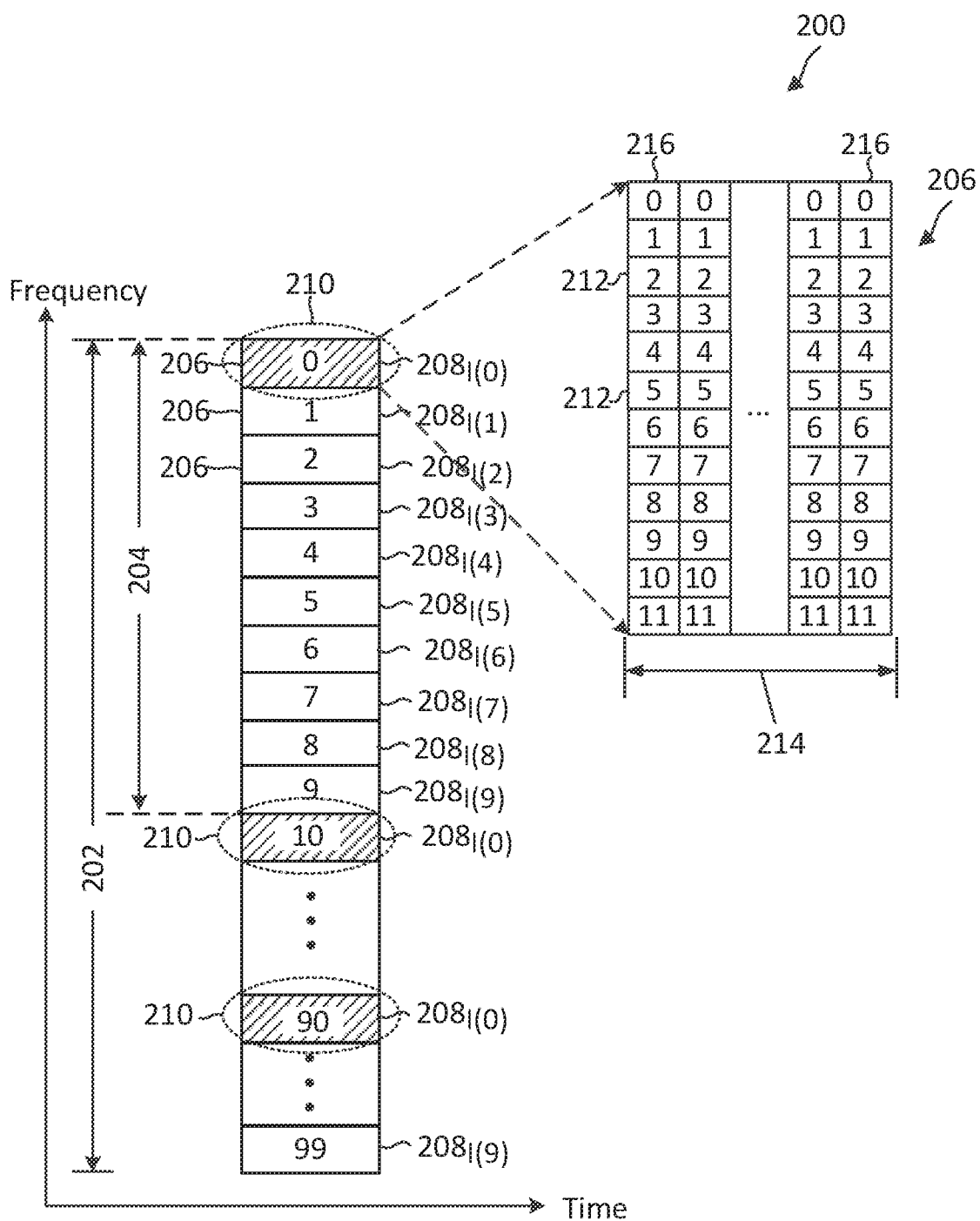
FIG. 2 illustrates a frequency interlaced-based resource allocation scheme according to some embodiments of the present disclosure.

FIG. 2 illustrates a frequency interlaced-based resource allocation scheme 200 according to some embodiments of the present disclosure. The scheme 200 may be employed by the network 100. In particular, BSs such as the BSs 105 and UEs such as the UEs 115 may communicate with each other using the scheme 200. In FIG. 2, the x-axis represents time in some constant units and the y-axis represents frequency in some constant units. In the scheme 200, a BS may communicate with a UE over a frequency band 202. There may be a PSD limitation or requirement for transmissions in the frequency band 202. The frequency band 202 may be located at any suitable frequencies. In some embodiments, the frequency band 202 may be at about 3.5 GHz, 6 GHz, or 60 GHz. The frequency band 202 may be partitioned into resource blocks (RBs) 206. Each RB 206 may span about twelve contiguous subcarriers 212 in frequency and a time period 214. The subcarriers 212 are indexed from 0 to 11. The time period 214 may span any suitable number of OFDM symbols 216. In some embodiments, the time period 214 may correspond to one transmission time interval (TTI), which may include about 14 OFDM symbols 216. The number of RBs 206 in the frequency band 202 may vary depending on the bandwidth of the frequency band 202 and the SCS of the subcarriers 212. The bandwidth and the SCS of the frequency band 202 may vary depending on the embodiments, for example, based on a network configuration and/or the frequency locations of the frequency band 202. In some embodiments, the frequency band 202 may correspond to a network system bandwidth (e.g., about 10 MHz, about 20 MHz, about 100 MHz or more). In some embodiments, the frequency band 202 may correspond to a bandwidth part (BWP) (e.g. a portion) within the network system bandwidth. For example, a network system bandwidth may be partitioned into about 4 BWPs and a BS may assign a UE with a certain BWP and communicate with the UE within the assigned BWP. The SCS can be about 15 kHz, about 30 kHz, about 60 kHz, or about 120 kHz.

The scheme 200 allocates resources in units of frequency interlaces 208. The scheme 200 configures interlaced frequency resources 210 at a granularity level of an RB 206. In other words, each interlaced frequency resource 210 may correspond to one RB 206. The scheme 200 may configure a plurality of non-overlapping frequency interlaces 208 in the frequency band 202. Each frequency interlace 208 may include a set of interlaced frequency resources 210 spaced apart from each other by one or more other interlaced frequency resources 210 in the frequency band 202. Each interlaced frequency resource 210 may be referred to as an interlace element. Adjacent interlaced frequency resources 210 within a frequency interlace 208 may be separated by an interlace-spacing 204. The interlace-spacing 204 can be selected based on a PSD requirement in the frequency band 202. The interlace-spacing 204 may determine the number of frequency interlaces 210 in the frequency band 202.

As an example, the frequency band 202 may have a bandwidth of about 20 MHz with an SCS of about 15 kHz. Thus, the frequency band 202 may be partitioned into about 100 RBs 206 indexed from 0 to 99. A BS may select an interlace-spacing 204 that is above a certain threshold associated with a PSD requirement in the frequency band 202. For example, the frequency band 202 may have a PSD limit of about 10 dBm/MHz. Thus, the threshold can be about 960 kHz or 1 MHz. The BS may select an interlace-spacing 204 of about 2 MHz, which may allow for about 10 frequency interlaces 208 in the frequency band 202. The frequency interlaces 208 are shown as $208_{I(0)}$ to $208_{I(9)}$. Each frequency interlace 208 may have a size of about 10 interlaced frequency resources 210 or 10 RBs 206 interlacing with interlaced frequency resources 210 of another frequency interlace 208. For example, a frequency interlace $208_{I(0)}$ may include interlaced frequency resources 210 corresponding to RBs 206 indexed 0, 10, . . . , 90, shown as pattern-filled boxes. A BS may allocate the frequency interlace $208_{I(0)}$ to one UE and allocate the frequency interlace $208_{I(1)}$ to another UE.

The use of frequency interlacing to distribute an allocation into a wider bandwidth allows a transmitter to transmit at a higher power level than when an allocation occupies contiguous frequencies. As an example, the frequency band 202 may have a maximum allowable PSD level of about 10 dBm/MHz and a transmitter (e.g., the UEs 115) may have a power amplifier (PA) capable of transmitting at about 23 decibel milliwatt (dBm). When an allocation includes 10 contiguous RBs 206 corresponding to about a 2 MHz bandwidth, the UE may transmit at a maximum power of about 16 dBm to meet the PSD limit of about 10 dBm/MHz. However, when an allocation includes 10 RBs 206 distributed over about 20 MHz, the UE may transmit at the full power of about 23 dBm yet still maintaining a PSD level of about 10 dBm/MHz. Thus, the use of frequency interlacing can provide better power utilization.

While the scheme 200 illustrates the frequency band 202 being partitioned into frequency interlaces 208 with evenly spaced interlaced frequency resources 210 and the number of RBs 206 in the frequency band 202 being an integer multiple of the sizes of the frequency interlaces 208, a frequency band may be configured differently. For example, a BS may consider waveform types, frequency interlace sizes, and/or resource distribution patterns for an interlace configuration, as described in greater detail herein.

Figure 3:
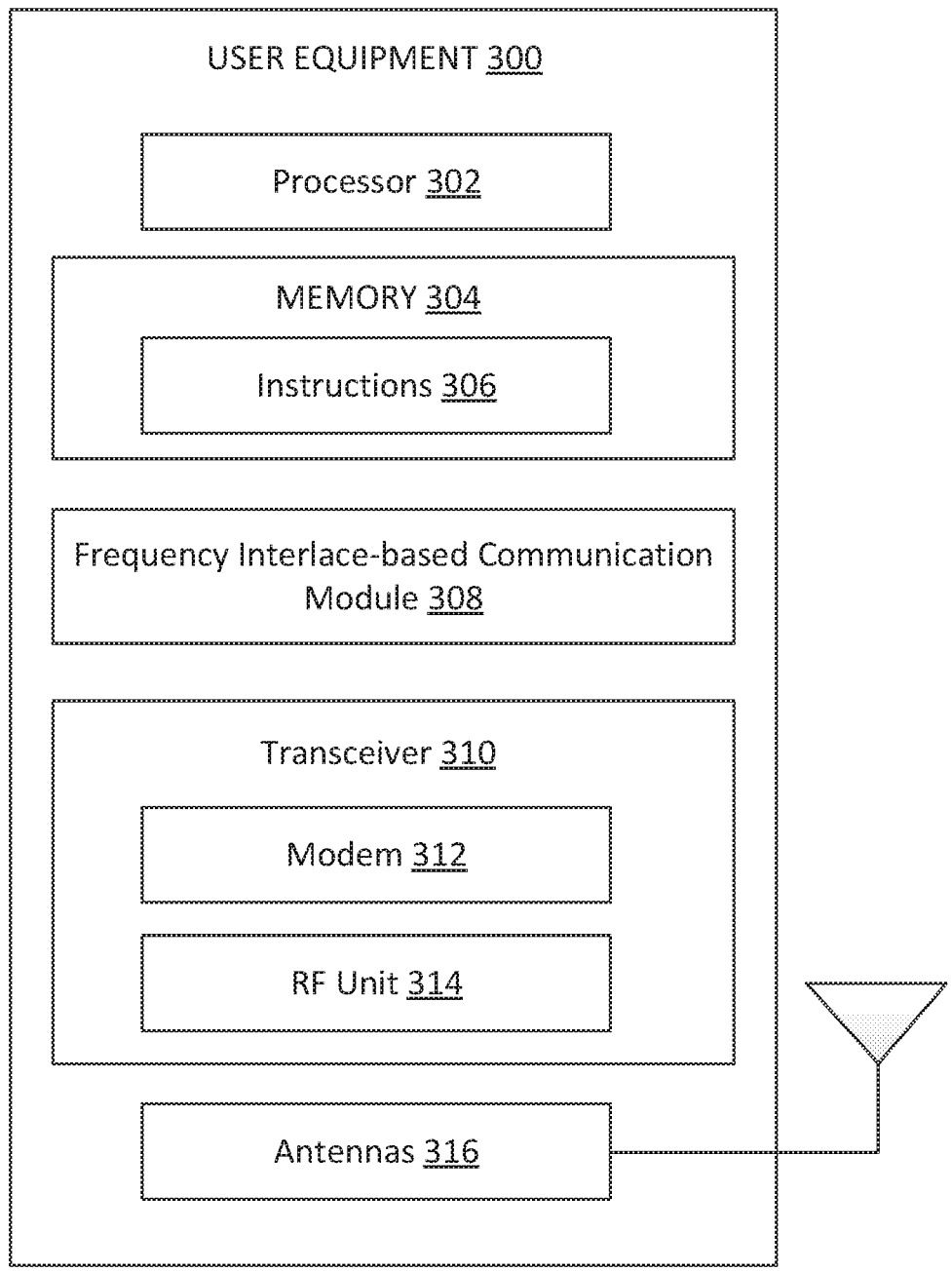
FIG. 3 is a block diagram of an exemplary user equipment (UE) according to embodiments of the present disclosure.

FIG. 3 is a block diagram of an exemplary UE 300 according to embodiments of the present disclosure. The UE 300 may be a UE 115 as discussed above. As shown, the UE 300 may include a processor 302, a memory 304, a frequency interlace-based communication module 308, a transceiver 310 including a modem subsystem 312 and a radio frequency (RF) unit 314, and one or more antennas 316. These elements may be in direct or indirect communication with each other, for example via one or more buses.

The processor 302 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 302 may also be implemented as a combination of computing devices, e.g., a combination of a DSP and a microprocessor, a plurality of microprocessors, one or more microprocessors in conjunction with a DSP core, or any other such configuration.

The memory 304 may include a cache memory (e.g., a cache memory of the processor 302), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 304 includes a non-transitory computer-readable medium. The memory 304 may store instructions 306. The instructions 306 may include instructions that, when executed by the processor 302, cause the processor 302 to perform the operations described herein with reference to the UEs 115 in connection with embodiments of the present disclosure, for example, aspects of FIGS. 5-14. Instructions 306 may also be referred to as code. The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may include a single computer-readable statement or many computer-readable statements.

The frequency interlace-based communication module 308 may be implemented via hardware, software, or combinations thereof. For example, the frequency interlace-based communication module 308 may be implemented as a processor, circuit, and/or instructions 306 stored in the memory 304 and executed by the processor 302. The frequency interlace-based communication module 308 may be used for various aspects of the present disclosure, for example, aspects of FIGS. 5-14. For example, the frequency interlace-based communication module 308 is configured to receive frequency interlace-based allocations and frequency resource exclusion rules and/or configurations from a BS (e.g., the BSs 105), determine whether to exclude certain frequency resources from the received allocations based on the exclusion rules and/or configurations, and/or communicate with the BS based on the allocations after applying the exclusion rules. The exclusion rules can be dependent on a communication signal waveform, a frequency interlace size constraint, and/or a frequency resource distribution pattern. Mechanisms for communicating using frequency interlaced-based allocations are described in greater detail herein.

As shown, the transceiver 310 may include the modem subsystem 312 and the RF unit 314. The transceiver 310 can be configured to communicate bi-directionally with other devices, such as the BSs 105. The modem subsystem 312 may be configured to modulate and/or encode the data from the memory 304, and/or the frequency interlace-based communication module 308 according to a modulation and coding scheme (MCS), e.g., a low-density parity check (LDPC) coding scheme, a turbo coding scheme, a convolutional coding scheme, a digital beamforming scheme, etc. The RF unit 314 may be configured to process (e.g., perform analog to digital conversion or digital to analog conversion, etc.) modulated/encoded data from the modem subsystem 312 (on outbound transmissions) or of transmissions originating from another source such as a UE 115 or a BS 105. The RF unit 314 may be further configured to perform analog beamforming in conjunction with the digital beamforming. Although shown as integrated together in transceiver 310, the modem subsystem 312 and the RF unit 314 may be separate devices that are coupled together at the UE 115 to enable the UE 115 to communicate with other devices.

The RF unit 314 may provide the modulated and/or processed data, e.g. data packets (or, more generally, data messages that may contain one or more data packets and other information), to the antennas 316 for transmission to one or more other devices. The antennas 316 may further receive data messages transmitted from other devices. The antennas 316 may provide the received data messages for processing and/or demodulation at the transceiver 310. The antennas 316 may include multiple antennas of similar or different designs in order to sustain multiple transmission links. The RF unit 314 may configure the antennas 316.

Figure 4:
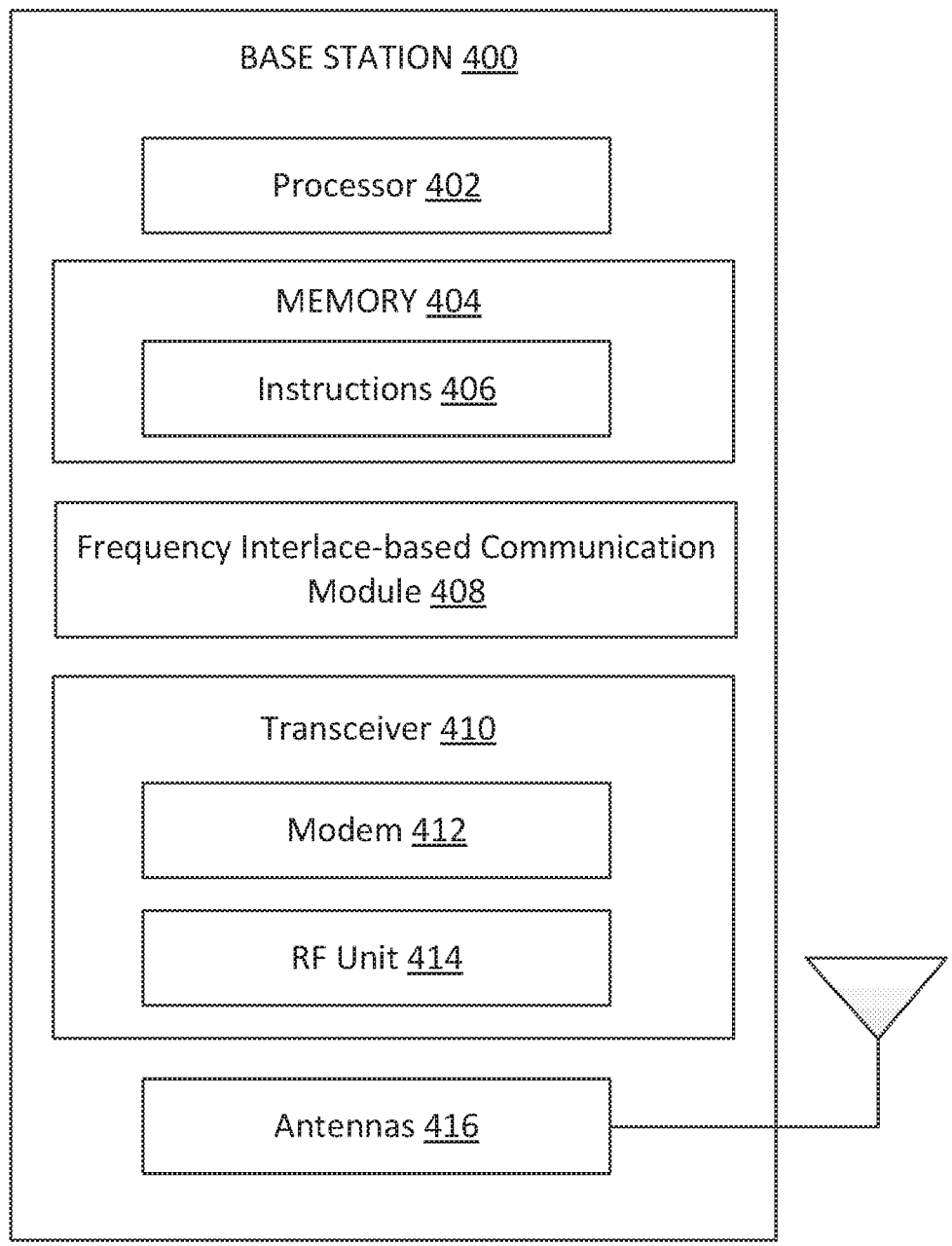
FIG. 4 is a block diagram of an exemplary base station (BS) according to embodiments of the present disclosure.

FIG. 4 is a block diagram of an exemplary BS 400 according to embodiments of the present disclosure. The BS 400 may be a BS 105 as discussed above. A shown, the BS 400 may include a processor 402, a memory 404, a frequency interlace-based communication module 408, a transceiver 410 including a modem subsystem 412 and a RF unit 414, and one or more antennas 416. These elements may be in direct or indirect communication with each other, for example via one or more buses.

The processor 402 may have various features as a specific-type processor. For example, these may include a CPU, a DSP, an ASIC, a controller, a FPGA device, another hardware device, a firmware device, or any combination thereof configured to perform the operations described herein. The processor 402 may also be implemented as a combination of computing devices, e.g., a combination of a DSP and a microprocessor, a plurality of microprocessors, one or more microprocessors in conjunction with a DSP core, or any other such configuration.

The memory 404 may include a cache memory (e.g., a cache memory of the processor 402), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some embodiments, the memory 404 may include a non-transitory computer-readable medium. The memory 404 may store instructions 406. The instructions 406 may include instructions that, when executed by the processor 402, cause the processor 402 to perform operations described herein, for example, aspects of FIGS. 5-14. Instructions 406 may also be referred to as code, which may be interpreted broadly to include any type of computer-readable statement(s) as discussed above with respect to FIG. 3.

The frequency interlace-based communication module 408 may be implemented via hardware, software, or combinations thereof. For example, the frequency interlace-based communication module 408 may be implemented as a processor, circuit, and/or instructions 406 stored in the memory 404 and executed by the processor 402. The frequency interlace-based communication module 408 may be used for various aspects of the present disclosure, for example, aspects of FIGS. 5-14. For example, the frequency interlace-based communication module 408 is configured to configure frequency interlaces in a frequency band to meet a PSD requirement of the frequency band, determine frequency interlace-based allocations for UEs (e.g., the UEs 115 and 300), transmit indicates of the allocations to the UEs, broadcast frequency resource exclusion rules and/or configurations to UEs in the network, and/or communicate with the UEs based on the allocations and/or the exclusion rules and/or configurations. The exclusion rules can be dependent on a communication signal waveform, a frequency interlace size constraint, and/or a frequency resource distribution pattern. Mechanisms for communicating using frequency interlaced-based allocations are described in greater detail herein.

As shown, the transceiver 410 may include the modem subsystem 412 and the RF unit 414. The transceiver 410 can be configured to communicate bi-directionally with other devices, such as the UEs 115 and/or another core network element. The modem subsystem 412 may be configured to modulate and/or encode data according to a MCS, e.g., a LDPC coding scheme, a turbo coding scheme, a convolutional coding scheme, a digital beamforming scheme, etc. The RF unit 414 may be configured to process (e.g., perform analog to digital conversion or digital to analog conversion, etc.) modulated/encoded data from the modem subsystem 412 (on outbound transmissions) or of transmissions originating from another source such as a UE 115 or 300. The RF unit 414 may be further configured to perform analog beamforming in conjunction with the digital beamforming. Although shown as integrated together in transceiver 410, the modem subsystem 412 and the RF unit 414 may be separate devices that are coupled together at the BS 105 to enable the BS 105 to communicate with other devices.

The RF unit 414 may provide the modulated and/or processed data, e.g. data packets (or, more generally, data messages that may contain one or more data packets and other information), to the antennas 416 for transmission to one or more other devices. The antennas 416 may further receive data messages transmitted from other devices and provide the received data messages for processing and/or demodulation at the transceiver 410. The antennas 416 may include multiple antennas of similar or different designs in order to sustain multiple transmission links.

Figure 5:
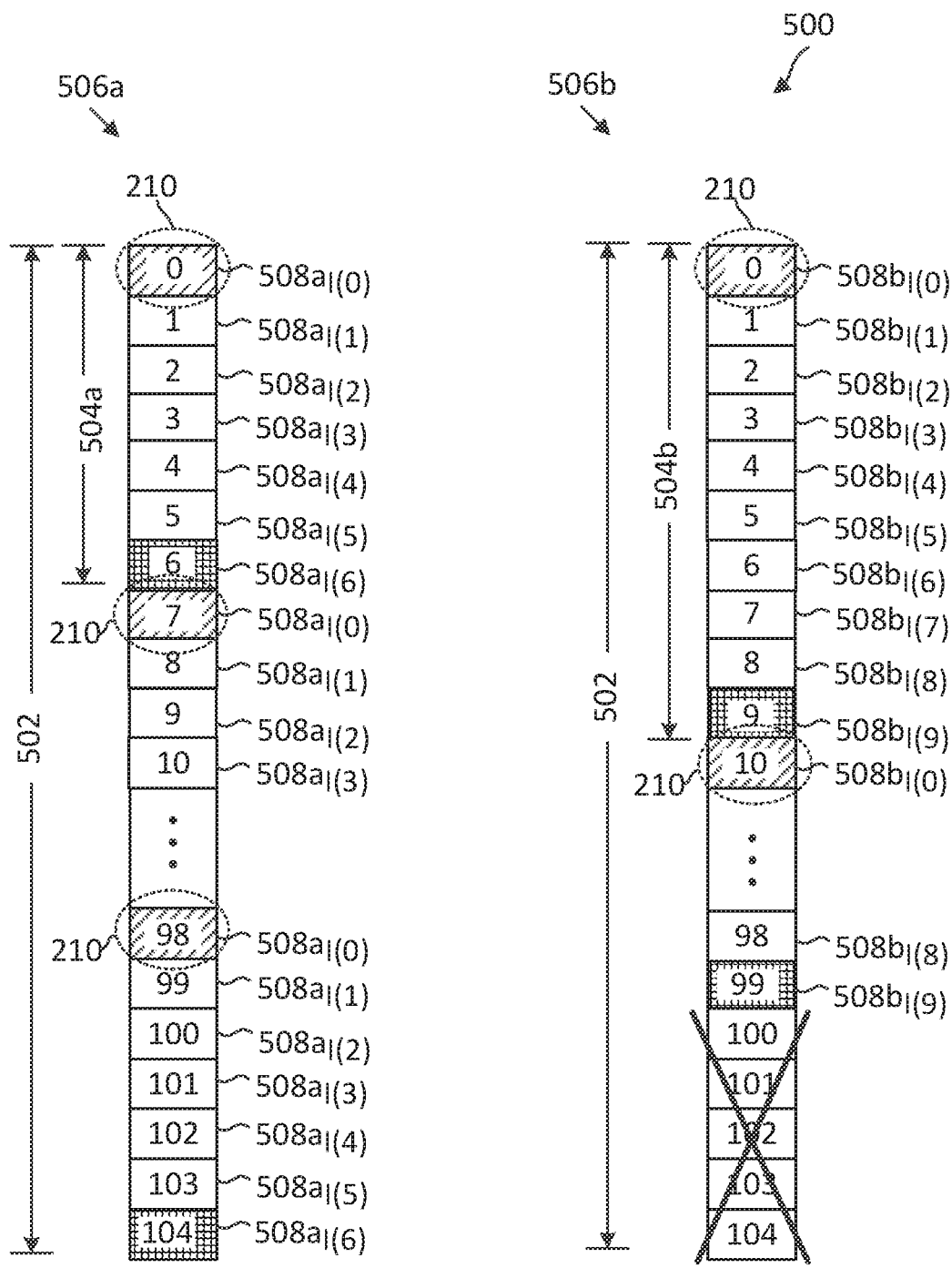
FIG. 5 illustrates a frequency interlaced-based resource allocation scheme according to some embodiments of the present disclosure.

FIG. 5 illustrates a frequency interlaced-based resource allocation scheme 500 according to some embodiments of the present disclosure. The scheme 500 may be employed by UEs such as the UEs 115 and 300 and BSs such as the BSs 105 and 400 in a network such as the network 100. The scheme 500 may include a substantially similar frequency resource configuration as in the scheme 200 and may allocate resources in units of frequency interlaces 508. However, the scheme 500 may configure frequency interlaces 508 with considerations for frequency interlace sizes, frequency interlace distribution patterns, and/or communication waveform types.

In the scheme 500, a frequency band 502 may include about 105 interlaced frequency resources 210 indexed 0 to 104. The scheme 500 may select an interlace-spacing 504 that is greater than a threshold, for example, about 1 MHz or about 960 kHz based on a PSD limit in the frequency band 502. The scheme 500 may configure M number of frequency interlaces 508 in the frequency band 502 based on the interlace-spacing 504, where M is a positive integer. The scheme 500 configures frequency interlaces 508 of equal sizes, denoted as N, where N is a positive integer. For example, the scheme 500 may determine a number of interlaced frequency resources 210 for the frequency interlaces 508 based on the bandwidth of the frequency band 502 and the interlace-spacing 504. When the number of interlaced frequency resources 210 is a non-integer multiple of M, the scheme 500 may exclude some interlaced frequency resources 210 from the configuration.

In addition, the scheme 500 may consider signal waveform types during the configuration. For example, the scheme 500 may configure the frequency interlaces 508 for communications with an OFDM waveform and/or a DFT-s-OFDM waveform. An allocation for a communication signal with a DFT-s-OFDM waveform may require a number of interlaced frequency resources 210 in the allocation to be a multiple of the numbers 2, 3, or 5. For example, the number of allocated frequency resources 210 or the allocation size can be expressed in the form of $(2^{\alpha} \times 3^{\beta} \times 5^{\gamma})$. Such an allocation size condition may be referred to as an integer multiple size constraint. In contrast, an allocation for a communication signal with an OFDM waveform may not require such an integer multiple size constraint. Thus, the scheme 500 may further select the frequency interlace size N such that N is the largest number with factors 2, 3 or 5 only, such that N times the interlace spacing is not greater than the bandwidth of the frequency band. The scheme 500 may exclude some interlaced frequency resources 210 from the configuration to satisfy the integer multiple size constraint.

Further, the scheme 500 may consider a frequency distribution pattern of the frequency interlaces 508 during the configuration. For example, a frequency interlace 508 including interlaced frequency resources 210 evenly spaced in the frequency band 502 may provide a lower peak-to-average power ratio (PAPR) than a frequency interlace 508 with a non-uniform frequency distribution pattern. Thus, the scheme 500 may exclude some interlaced frequency resources 210 from the configuration to satisfy the uniform pattern constraint. For example, the scheme 500 may exclude some frequency resources at edges of the frequency band 502.

The scheme 500 illustrates two configurations 506a and 506b. The scheme 500 may determine an interlace-spacing 504a for the configuration 506a and a greater interlace-spacing 504b to satisfy the threshold. The scheme 500 may select the greater interlace-spacing 504b to provide a particular allocation capacity and/or to support a particular UE capability or a particular power utilization factor.

As shown, the configuration 506a includes about 7 (e.g., M=7) frequency interlaces 508a, each including about 15 (e.g., N=15) interlaced frequency resources 210 satisfying the integer multiple size constraint and the uniform pattern constraint. The frequency interlaces 508a are shown as $508a_{I(0)}$ to $508a_{I(6)}$. A BS may allocate the frequency interlace $508a_{I(0)}$ to one UE and the frequency interlace $508a_{I(6)}$ to another UE.

The configuration 506b includes about 10 (e.g., M=10) frequency interlaces 508b, each including about 10 (e.g., M=10) interlaced frequency resources 210, where 5 of the interlaced frequency resources 210 (e.g., indexed 100 to 104) may be unused or excluded as shown by the cross, in order to satisfy the integer multiple size constraint. The frequency interlaces 508b are shown as $508b_{I(0)}$ to $508b_{I(9)}$. A BS may allocate the frequency interlace $508b_{I(0)}$ to one UE and the frequency interlace $508b_{I(9)}$ to another UE.

While the configuration 506b excludes unused frequency resources 210 from one edge (e.g., high frequencies) of the frequency band 502, in some embodiments, the scheme 500 can exclude unused frequency resources 210 from the other edge (e.g., low frequencies) of the frequency band 502 or from both edges of the frequency band 502. For example, the configuration 506b can exclude frequency resources 210 indexed 0 to 4 from the other edge. Alternatively, the configuration 506b can exclude frequency resources 210 indexed 0 and 1 at one edge and frequency resources 210 indexed 102 to 104 at the other edge. In some embodiments, a BS may broadcast frequency interlace configurations and/or frequency resource exclusion rules to facilitate resource allocations in the network, as described in greater detail herein.

Figure 6:
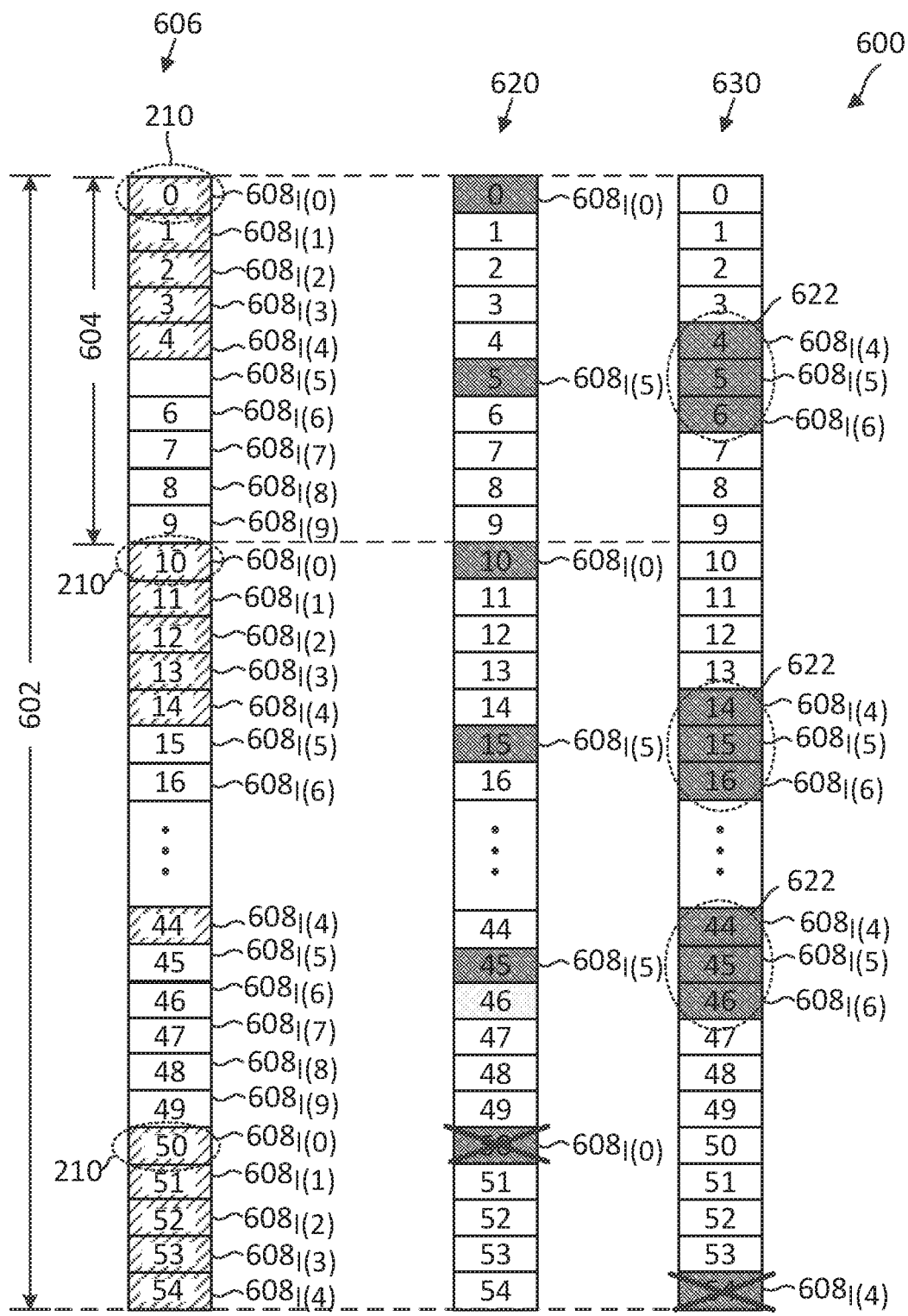
FIG. 6 illustrates a frequency interlaced-based resource allocation scheme according to some embodiments of the present disclosure.

FIG. 6 illustrates a frequency interlaced-based resource allocation scheme 600 according to some embodiments of the present disclosure. The scheme 600 may be employed by UEs such as the UEs 115 and 300 and BSs such as the BSs 105 and 400 in a network such as the network 100. The scheme 600 may be substantially similar to the scheme 500, but may configure frequency interlaces 608 with different sizes.

In the scheme 600, a frequency band 602 includes about 55 interlaced frequency resources 210 indexed 0 to 54. The scheme 600 may select an interlace-spacing 604 that is greater than a threshold, for example, about 1 MHz or about 960 kHz based on a PSD limit in the frequency band 602. The scheme 600 may configure M number of frequency interlaces 508 in the frequency band 502 based on the interlace-spacing 504, where M is a positive integer. When the number of interlaced frequency resources 210 is a non-integer multiple of M, the scheme 600 allows some frequency interlaces 608 to have a size of N and some frequency interlaces 608 to have a size of (N+1). For example, M1 frequency interlaces 608 may have a size of (N+1) and (M−M1) frequency interlaces 608 may have a size of N, where M1 is a positive integer.

As shown, the configuration 606 includes about 10 (e.g., M=10) frequency interlaces 608. The frequency interlaces 608 are shown as $608_{I(0)}$ to $608_{I(9)}$. The frequency interlaces $608_{I(0)}$ to $608_{I(4)}$ may each include a size of 6 as shown by the pattern-filled boxes. The frequency interlaces $608_{I(5)}$ to $608_{I(9)}$ may each include a size of 5 as shown by the empty-filled boxes. Thus, N is 5 and M1 is 5.

In an embodiment, the scheme 600 may schedule or allocate one or more frequency interlaces to a UE. Similar to the scheme 500, the scheme 600 may consider the integer multiple size constraint and/or the uniform pattern constraint during resource scheduling. When an allocation includes one frequency interlace 608 with a size of N and another frequency interlace 608 with a size of (N+1), with each N and N+1 satisfying the integer multiple constraint individually, the scheme 600 may exclude one interlaced frequency resource 210 from the frequency interlace 608 with size (N+1) to get a total allocation size of 2N which satisfies the integer multiple size constraint. In some embodiments, the scheme 600 may not maintain the integer multiple size constraint when the allocation is for an OFDM signal communication.

As an example, an allocation 620 may include the frequency interlaces $608_{I(0)}$ and $608_{I(5)}$ as shown by the pattern-filled boxes. The frequency interlace $608_{I(0)}$ includes 6 (e.g., a size of (N+1)) interlaced frequency resources 210 and the frequency interlace $608_{I(5)}$ includes 5 (e.g., a size of N and an integer multiple of 5) interlaced frequency resources 210. To satisfy the integer multiple size constraint, the allocation 620 excludes an interlaced frequency resource 210 indexed 50 at the edge of the frequency band 602 from the frequency interlace $608_{I(0)}$ (e.g., with size (N+1)) as shown by the cross.

In another example, an allocation 630 may include the frequency interlaces $608_{I(4)}$, $608_{I(5)}$, and $608_{I(6)}$ as shown by the pattern-filled boxes. The frequency interlace $608_{I(4)}$ includes 6 (e.g., a size of (N+1)) interlaced frequency resources 210 and the frequency interlace $608_{I(5)}$ and $608_{I(6)}$ each includes 5 (e.g., a size of N and an integer multiple of 5) interlaced frequency resources 210. To satisfy the integer multiple size constraint and the uniform pattern constraint, the allocation 630 excludes interlaced frequency resources 210 indexed 54 at the edge of the frequency band 602 from the frequency interlace $608_{I(4)}$ as shown by the cross. As shown, the allocation 630 includes groups 622 of interlaced frequency resources 210 evenly spaced in the frequency band 602.

Similar to the scheme 500, the scheme 600 may exclude unused frequency resources 210 from a high-frequency edge and/or a low-frequency edge of the frequency band 602. A BS may broadcast frequency interlace configurations and/or frequency resource exclusion rules to facilitate resource allocations in the network, as described in greater detail herein.

FIGS. 7-12 illustrate various mechanisms for configuring frequency interlaces (e.g., the frequency interlaces 208) with different SCSs in a frequency band. While FIGS. 7-12 illustrate mix SCS configurations in the context of one configuration with a first SCS, denoted as $f_{scs1}$, and another configuration with a second SCS, denoted as $f_{scs1}$, that is about twice the first SCS (e.g., $f_{scs2}=2\times f_{scs1}$), similar mechanisms may be applied for SCSs with different factors (e.g., about 4 or about 8) and may be scaled to include any suitable number of configurations (e.g., about 3, about 4, or about 5). For example, the first SCS may be about 15 kHz and the second SCS may be about 30 kHz. Alternatively, the first SCS may be about 30 kHz and the second SCS may be about 60 kHz. Yet alternatively, the first SCS may be about 60 kHz and the second SCS may be about 120 kHz.

Figure 7:
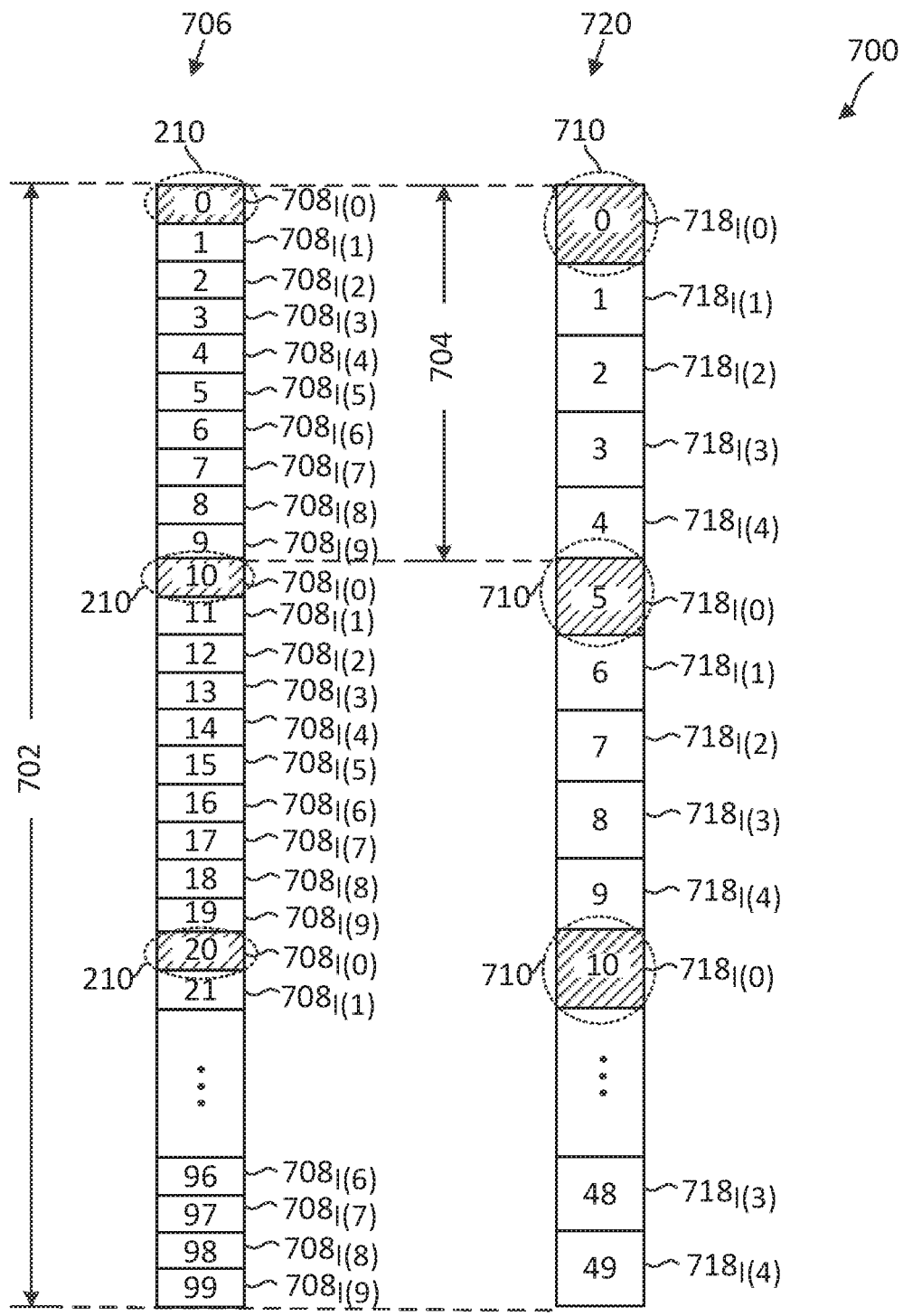
FIG. 7 illustrates a frequency interlaced-based resource allocation scheme according to some embodiments of the present disclosure.

FIG. 7 illustrates a frequency interlaced-based resource allocation scheme 700 according to some embodiments of the present disclosure. The scheme 700 may be employed by UEs such as the UEs 115 and 300 and BSs such as the BSs 105 and 400 in a network such as the network 100. The scheme 700 may be substantially similar to the schemes 500 and 600. However, the scheme 700 supports multiple interlace configurations with different SCSs in a frequency band 702. For example, the scheme 700 may include a configuration 706 for the first SCS, $f_{scs1}$, and a configuration 720 for the second SCS, $f_{scs2}$. The scheme 700 may keep the same number of subcarriers (e.g., the subcarriers 212) per interlaced frequency resource across the configurations 706 and 720. Thus, a frequency resource 710 in the configuration 720 may occupy twice the bandwidth of a frequency resource 210 in the configuration 706. In addition, the scheme 700 may keep the same interlace-spacing 704 across the configurations 706 and 720. Thus, the number of frequency interlaces 718 in the configuration 720 may be about half the number of frequency interlaces 708 in the configuration 706. However, the frequency interlaces 718 may have the same size as the frequency interlaces 708.

As shown, the configuration 706 includes about 100 interlaced frequency resources 210 in the frequency band 702 while the configuration 720 includes about 50 interlaced frequency resources 710 in the frequency band 702. The frequency interlace resources 210 are indexed from 0 to 99. The frequency interlace resources 710 are indexed from 0 to 49. The configuration 706 includes about 10 frequency interlaces 708 (e.g., shown as $708_{I(0)}$ and $708_{I(9)}$). The configuration 720 includes about 5 frequency interlaces 718 shown as $718_{I(4)}$ and $718_{I(4)}$. The frequency interlaces 718 in the configuration 720 and the frequency interlaces 708 in the configuration 706 have the same size. For example, each frequency interlace 708 includes about 10 interlaced frequency resources 210 spaced apart in the frequency band 702 satisfying the integer multiple size constraint and the uniform pattern constraint. Each frequency interlace 718 includes about 10 interlaced frequency resources 210 spaced apart in the frequency band 702 satisfying the integer multiple size constraint and the uniform pattern constraint.

As can be seen, each frequency interlace 718 of the second SCS, $f_{scs2}$, may correspond to two frequency interlaces 708 of the first SCS, $f_{scs1}$, and are aligned to the even numbered frequency interlaces 708. For example, the frequency interlace $718_{I(0)}$ corresponds to the frequency interlaces $708_{I(0)}$ and $708_{I(1)}$. Similarly, the frequency interlace $718_{I(1)}$ corresponds to the frequency interlaces $708_{I(2)}$ and $708_{I(3)}$.

In an embodiment, a BS may allocate a frequency interlace $708_{I(0)}$ to a UE from the configuration 706 for a communication using the first SCS and may allocate a frequency interlace $718_{I(1)}$ from the configuration 720 to another UE for a communication using the second SCS. In some embodiments, the first communication and the second communication may occur simultaneously in a TTI (e.g., the time period 214) since the allocated frequency interlaces $708_{I(0)}$ and $718_{I(1)}$ are non-overlapping.

Figure 8:
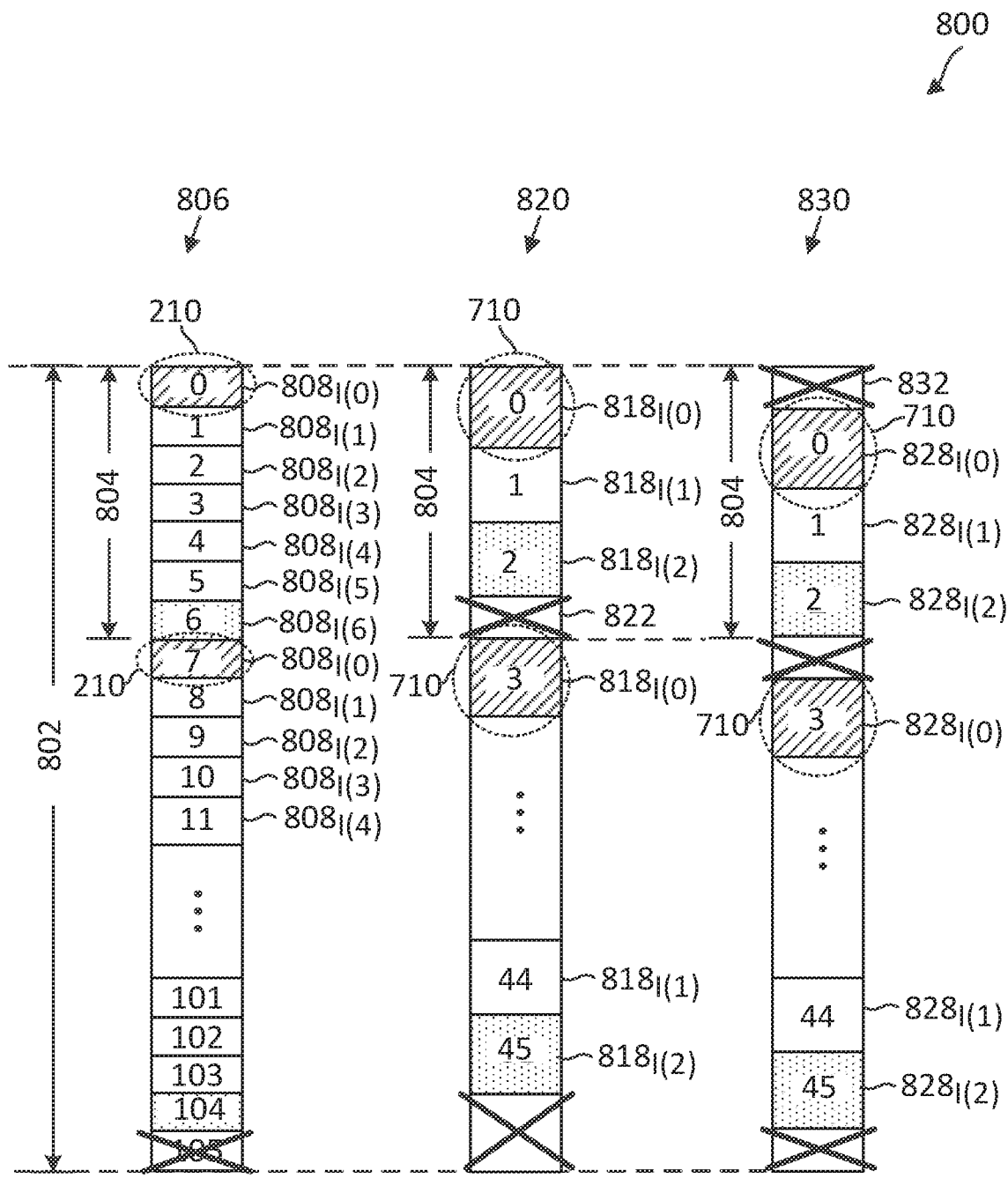
FIG. 8 illustrates a frequency interlaced-based resource allocation scheme according to some embodiments of the present disclosure.

FIG. 8 illustrates a frequency interlaced-based resource allocation scheme 800 according to some embodiments of the present disclosure. The scheme 800 may be employed by UEs such as the UEs 115 and 300 and BSs such as the BSs 105 and 400 in a network such as the network 100. The scheme 800 is substantially similar to the scheme 700, but illustrates an example when a configuration 806 of the lower first SCS (e.g., $f_{scs1}$) includes an odd number of frequency interlaces 808 in a frequency band 802.

As shown, the configuration 806 includes about 106 interlaced frequency resources 210 indexed 0 to 105. The configuration 806 includes about 7 frequency interlaces 808, for example, based on an interlace-spacing 804. The configuration 806 excludes the interlaced frequency resource 210 indexed 105 as shown by the cross such that each frequency interlace 808 includes a size of about 15 satisfying the integer multiple size constraint and a distribution satisfying the uniform pattern constraint. The frequency interlaces 808 are shown as $808_{I(0)}$ and $808_{I(6)}$.

The configurations 820 and 830 illustrate example configurations for the second SCS (e.g., $f_{scs2}$). The configuration 820 includes about 3 frequency interlaces 818 aligned to the even numbered frequency interlaces 808 with an offset 822 corresponding to the frequency interlace 808 with the highest frequencies (e.g., the frequency interlace $808_{I(6)}$). In other words, the frequency interlaces 818 are aligned to the frequency interlaces 808 with an offset of 0. For example, the frequency interlace $818_{I(0)}$ corresponds to the frequency interlaces $808_{I(0)}$ and $808_{I(1)}$. The frequency interlace $818_{I(1)}$ corresponds to the frequency interlaces $808_{I(2)}$ and $808_{I(3)}$. The offset 822 and unused frequencies are shown by the crosses.

Similarly, the configuration 830 includes about 3 frequency interlaces 828 aligned to odd numbered interlaces 808 with an offset 832 corresponding to the frequency interlace 808 with the lowest frequencies (e.g., the frequency interlace $808_{I(0)}$). In other words, the frequency interlaces 828 are aligned to the frequency interlaces 808 with an offset of 1. For example, the frequency interlace $828_{I(0)}$ corresponds to the frequency interlaces $808_{I(1)}$ and $808_{I(2)}$. The frequency interlace $828_{I(1)}$ corresponds to the frequency interlaces $808_{I(3)}$ and $808_{I(4)}$. The offset 832 and unused frequencies are shown by the crosses.

In an embodiment, a BS may allocate a frequency interlace $808_{I(0)}$ to a UE from the configuration 806 for a communication using the first SCS and may allocate a frequency interlace $818_{I(1)}$ from the configuration 820 to another UE for a communication using the second SCS. In some embodiments, the first communication and the second communication may occur simultaneously in a TTI (e.g., the time period 214) since the allocated frequency interlaces $808_{I(0)}$ and $818_{I(1)}$ are non-overlapping.

In an embodiment, a BS may allocate a frequency interlace $808_{I(0)}$ to a UE from the configuration 806 for a communication using the first SCS and may allocate a frequency interlace $828_{I(0)}$ from the configuration 820 to another UE for a communication using the second SCS. In some embodiments, the first communication and the second communication may occur simultaneously in a TTI (e.g., the time period 214) since the allocated frequency interlaces $808_{I(0)}$ and $828_{I(0)}$ are non-overlapping.

As can be seen from the schemes 700 and 800, when the SCS increases, the number of frequency interlaces decreases. For example, when the SCS increases by a factor of K, the number of frequency interlaces may reduce from about M to about $\lfloor M/K \rfloor$, where K is a positive integer. However, the frequency interlaces across different SCS configurations may have the same size.

Figure 9:
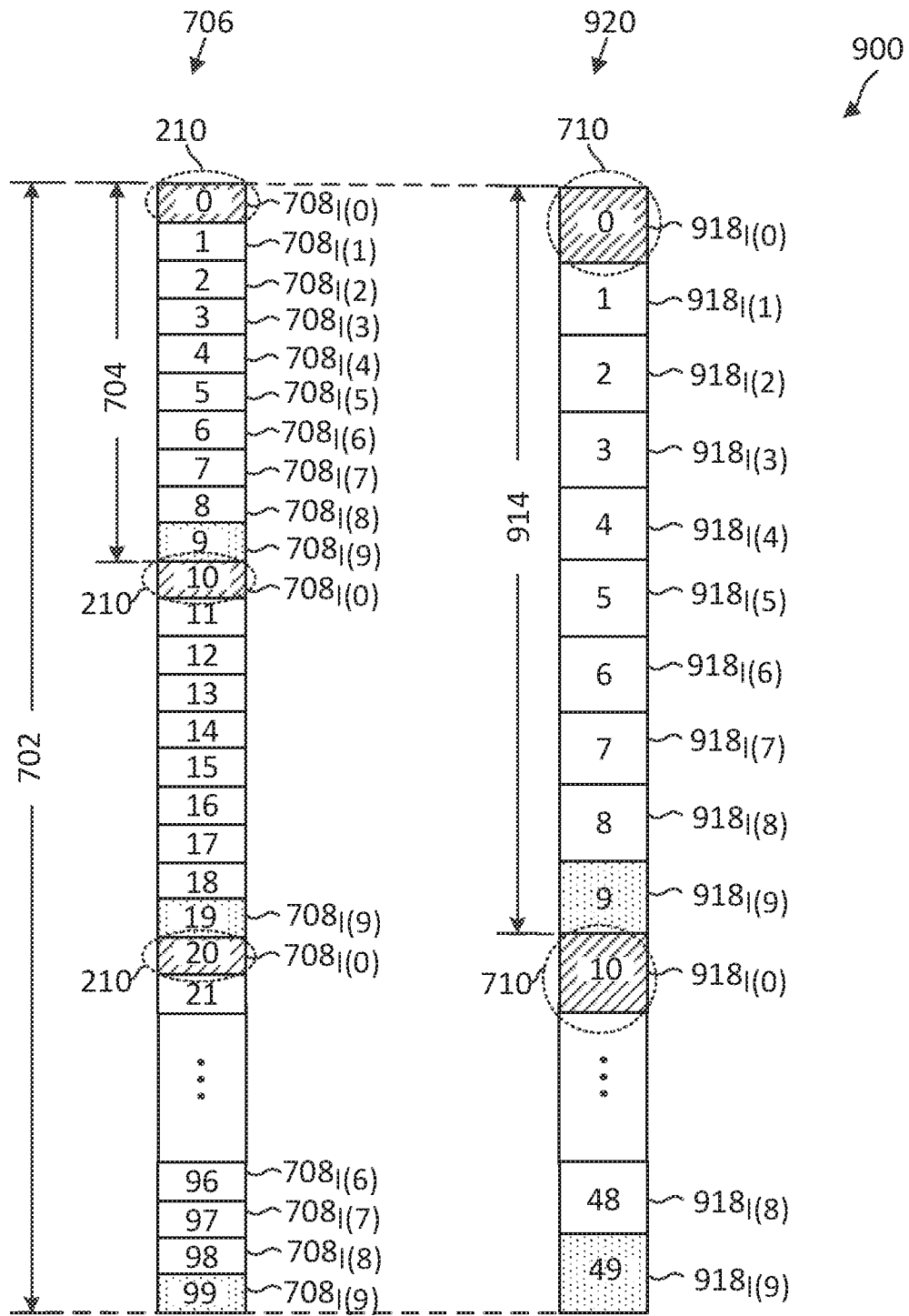
FIG. 9 illustrates a frequency interlaced-based resource allocation scheme according to some embodiments of the present disclosure.

FIG. 9 illustrates a frequency interlaced-based resource allocation scheme 900 according to some embodiments of the present disclosure. The scheme 900 may be employed by UEs such as the UEs 115 and 300 and BSs such as the BSs 105 and 400 in a network such as the network 100. Similar to the schemes 700 and 800, the scheme 900 may maintain the same number of subcarriers per interlaced frequency resource across configurations with different SCSs. However, the scheme 900 may scale the interlace-spacing based on the SCS instead of maintaining the same interlace-spacing as in the schemes 700 and 800.

The scheme 900 is illustrated using the same configuration 706 for the first SCS (e.g., $f_{scs1}$) as in the scheme 700. The configuration 920 illustrates an example configuration for the second SCS (e.g., $f_{scs2}$) in the frequency band 702. The configuration 920 includes an interlace-spacing 914, which may be about doubled the interlace-spacing 704 since the second SCS, $f_{scs2}$, is about twice the first SCS, $f_{scs1}$. The configuration 920 includes about 10 frequency interlaces 918 in the frequency band 702, each including about 5 interlaced frequency resources 710 spaced apart in the frequency band 702 satisfying the integer multiple size constraint and the uniform pattern constraint. The frequency interlaces 918 are shown as $918_{I(0)}$ and $918_{I(9)}$. As can be seen, the configuration 720 includes the same the number frequency interlaces as in the configuration 706, but the frequency interlace size is reduced.

In an embodiment, a BS may allocate a frequency interlace $708_{I(0)}$ to a UE from the configuration 706 for a communication using the first SCS and may allocate a frequency interlace $918_{I(1)}$ from the configuration 920 to another UE for a communication using the second SCS. In some embodiments, the first communication and the second communication may occur simultaneously in a TTI (e.g., the time period 214) since the allocated frequency interlaces $708_{I(0)}$ and $918_{I(1)}$ are non-overlapping.

Figure 10:
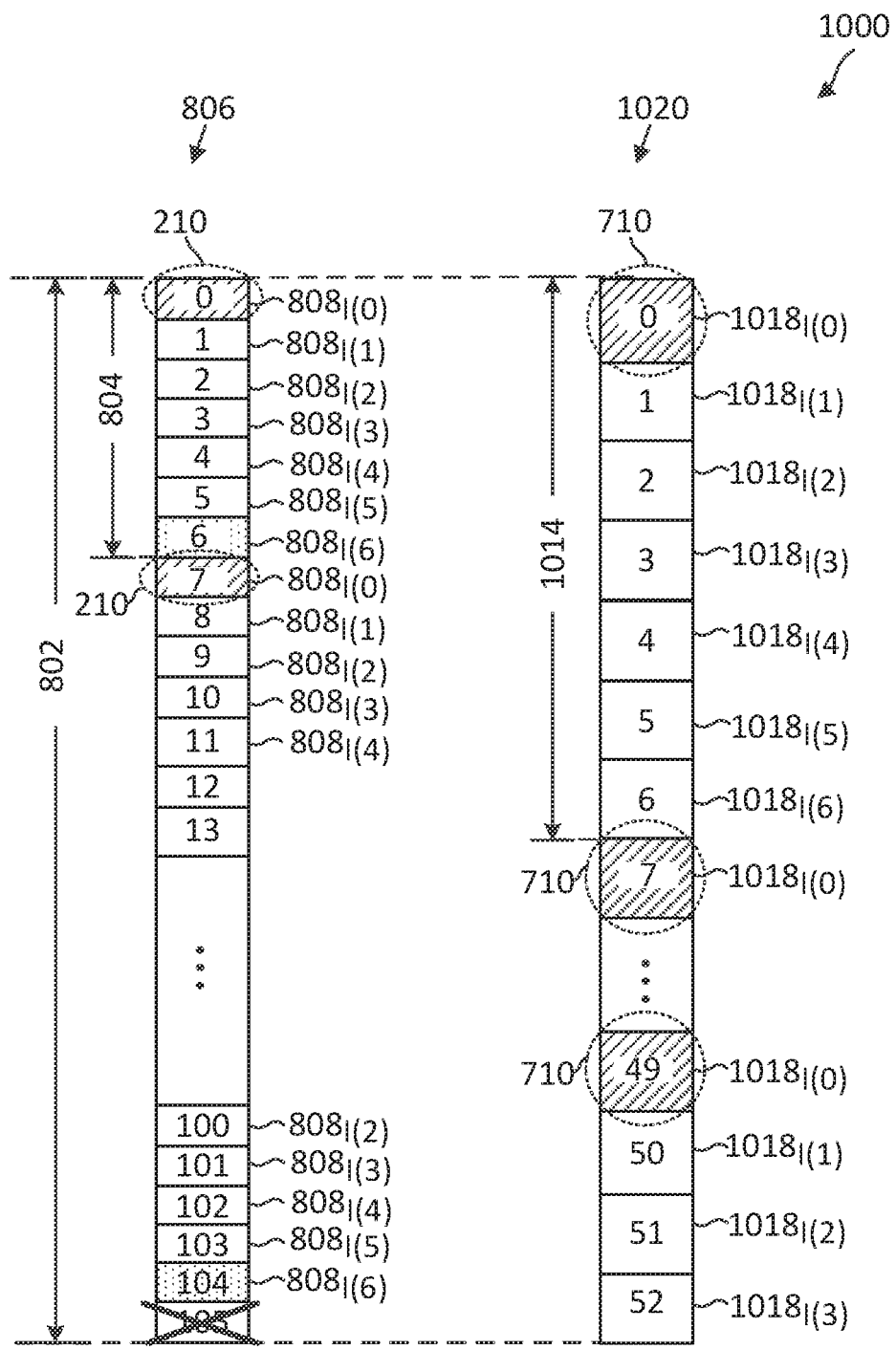
FIG. 10 illustrates a frequency interlaced-based resource allocation scheme according to some embodiments of the present disclosure.

FIG. 10 illustrates a frequency interlaced-based resource allocation scheme 1000 according to some embodiments of the present disclosure. The scheme 1000 may be employed by UEs such as the UEs 115 and 300 and BSs such as the BSs 105 and 400 in a network such as the network 100. The scheme 1000 is substantially similar to the scheme 900, but illustrates an example when a configuration at the lower first SCS (e.g., $f_{scs1}$) includes an odd number of frequency interlaces. The scheme 1000 is illustrated using the same configuration 806 for the first SCS (e.g., $f_{scs1}$) as in the scheme 800. The configuration 1020 illustrates an example configuration for the second SCS (e.g., $f_{scs2}$) in the frequency band 802. The configuration 1020 includes an interlace-spacing 1014, which may be about doubled the interlace-spacing 804. The configuration 1020 includes about 7 frequency interlaces 1018 in the frequency band 802. The frequency interlaces 918 are shown as $1018_{I(0)}$ and $1018_{I(6)}$. The frequency interlaces $1018_{I(0)}$ and $1018_{I(3)}$ may each include about 8 interlaced frequency resources 710 spaced apart in the frequency band 802. The frequency interlaces $1018_{I(4)}$ and $1018_{I(6)}$ may each include about 7 interlaced frequency resources 710 spaced apart in the frequency band 802.

In an embodiment, a BS may allocate a frequency interlace $808_{I(0)}$ to a UE from the configuration 806 for a communication using the first SCS and may allocate frequency interlace $1018_{I(1)}$ and $1018_{I(4)}$ from the configuration 1020 to another UE for a communication using the second SCS. In some embodiments, the first communication and the second communication may occur simultaneously in a TTI (e.g., the time period 214) since the allocated frequency interlaces $808_{I(0)}$ is non-overlapping with the frequency interlaces $1018_{I(1)}$ and $1018_{I(4)}$ s.

As can be seen from the schemes 900 and 1000, when the SCS increases, the frequency interlace size decreases. For example, when the SCS increases by a factor of K and the number of frequency interlaces in the lower SCS is even, the frequency interlace sizes may reduce by a factor of K, where K is a positive integer. When the SCS increases by a factor of K and the interlace size N in the lower SCS is a non-integer multiple of K, some frequency interlaces at the higher SCS may have a size $\lfloor N/K \rfloor$ and some frequency interlaces may have a size $\lceil N/K \rceil$. However, the number of frequency interlaces across different SCS configurations may be the same.

In general, the schemes 700 to 1000 may combine or merge frequency interlaces of a lower SCS to create a frequency interlace of a higher SCS. When the frequency interlaces of the lower SCS being merged have different number of frequency resources 210, one or more frequency resources from the lower SCS frequency interlace with the larger number of frequency resources may be excluded. For example, when merging a first lower-SCS frequency interlace of size N with a second lower-SCS frequency interlace of size (N+1) to create a higher SCS frequency interlace, one frequency resource may be excluded from the second lower-SCS frequency interlace.

Figure 11:
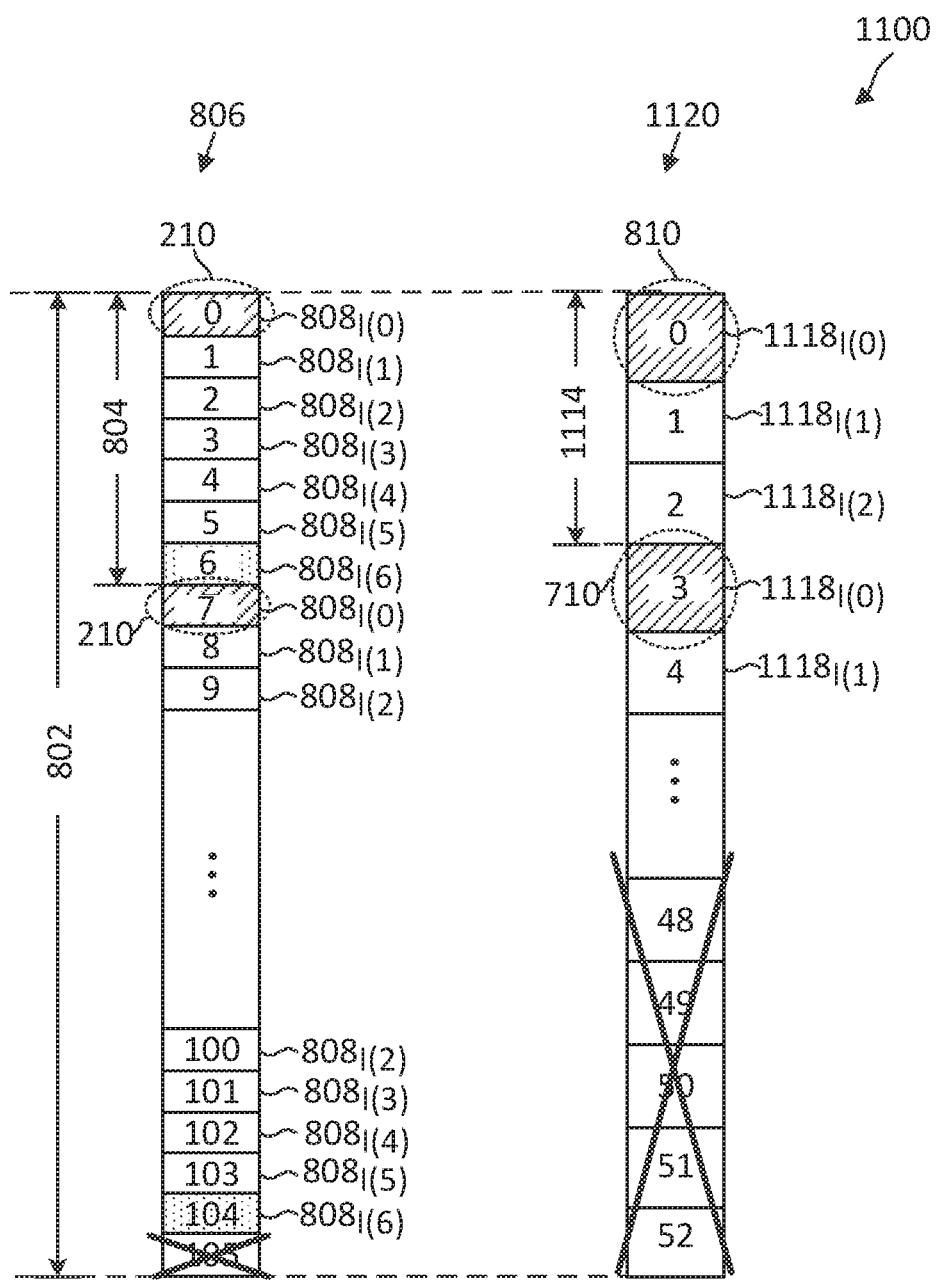
FIG. 11 illustrates a frequency interlaced-based resource allocation scheme according to some embodiments of the present disclosure.

FIG. 11 illustrates a frequency interlaced-based resource allocation scheme 1100 according to some embodiments of the present disclosure. The scheme 1100 may be employed by UEs such as the UEs 115 and 300 and BSs such as the BSs 105 and 400 in a network such as the network 100. The scheme 1100 configures frequency interlaces of different SCSs independently. The scheme 1100 is illustrated using the same configuration 806 for the first SCS (e.g., $f_{scs1}$) as in the scheme 800. The configuration 1120 illustrates an example configuration for the second SCS (e.g., $f_{scs2}$) in the frequency band 802. The configuration 1120 includes an interlace-spacing 1114 independent of the interlace-spacing 804. The configuration 1120 includes about 3 frequency interlaces 1118, each including about 15 interlaced frequency resources 710 spaced apart in the frequency band 802. The frequency interlaces 1118 are shown as $1118_{I(0)}$ and $1118_{I(2)}$.

Since the higher-SCS frequency interlaces 1118 are configured independently from the lower-SCS frequency interlaces 808, a high-SCS frequency interlace 818 may overlap with different low-SCS frequency interlaces 808 at different frequency locations. For example, the frequency interlace $1118_{I(0)}$ includes one frequency resource 710 indexed 0 overlapping with the frequency interlaces $808_{I(0)}$ and $808_{I(1)}$ and another frequency resource 710 indexed 3 overlapping with the frequency interlaces $808_{I(0)}$ and $808_{I(0)}$. As such, scheduling UEs to communicate with different SCSs in the same TTI may require a BS to consider each frequency location to ensure a scheduled low-SCS frequency interlace 808 is non-overlapping with a scheduled high-SCS frequency interlace 1118.

Figure 12:
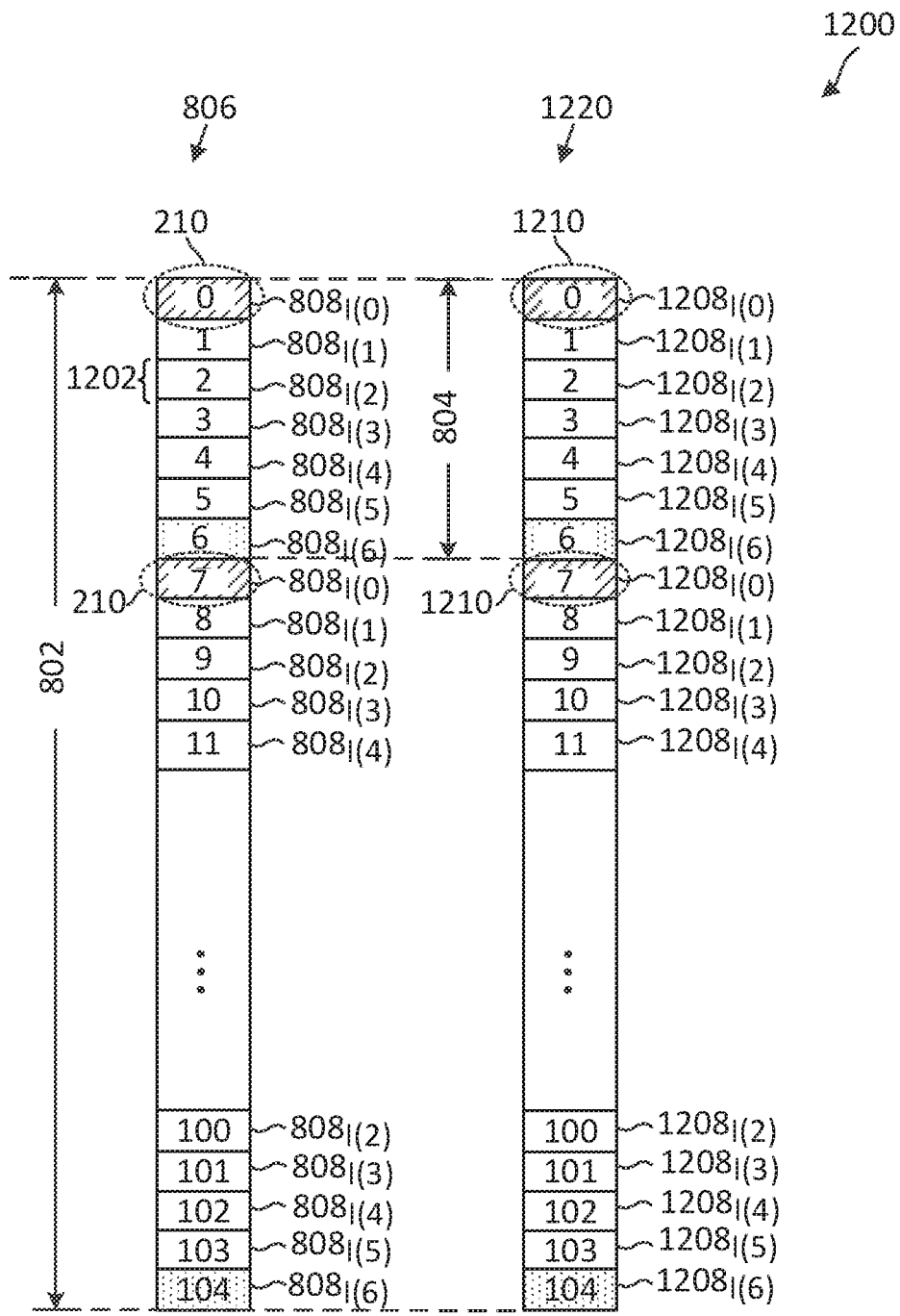
FIG. 12 illustrates a frequency interlaced-based resource allocation scheme according to some embodiments of the present disclosure.

FIG. 12 illustrates a frequency interlaced-based resource allocation scheme 1200 according to some embodiments of the present disclosure. The scheme 1200 may be employed by UEs such as the UEs 115 and 300 and BSs such as the BSs 105 and 400 in a network such as the network 100. Similar to the schemes 700-1100, the scheme 1200 may allow for frequency interlaces with different SCSs in a frequency band. However, the scheme 1200 may reduce the number of subcarriers (e.g., the subcarriers 212) per interlaced frequency resource in a higher SCS configuration to match a frequency resource bandwidth 1202 in a lower SCS configuration. Thus, the scheme 1200 may maintain the same number of frequency interlaces and the same frequency interlace sizes across different SCS configurations. In other words, the scheme 1200 maintains the frequency interlaced structure across different SCS configurations.

The scheme 1200 is illustrated using the same configuration 806 for the first SCS (e.g., $f_{scs1}$) as in the scheme 800. The configuration 1220 illustrates an example configuration for the second SCS (e.g., $f_{scs2}$) in the frequency band 802. The configuration 1220 includes the same interlace-spacing 804 as in the configuration 806. The configuration 1220 includes interlaced frequency resources 1210 aligned to the interlaced frequency resources 210 in the configuration 806. However, each interlaced frequency resources 1210 may include half the number of subcarriers compared to an interlaced frequency resource 210 since the second SCS, $f_{scs2}$, is about twice the first SCS, $f_{scs1}$. For example, each interlaced frequency resources 1210 may include about 6 subcarriers at the second SCS, $f_{scs2}$. The configuration 1220 includes about 7 frequency interlaces 1218 aligned to the frequency interlaces 808 in the configuration 806. The frequency interlaces 1218 are shown as $1218_{I(0)}$ and $1218_{I(6)}$. By reducing the bandwidth of the frequency resources 1210 at the second, higher SCS, the scheme 1200 may allow a UE to transmit about 3 dB higher power compared to the schemes 700-1100.

In an embodiment, a BS (e.g., the BSs 105) may employ any suitable combinations of the schemes 500-1200 described above with respect to FIGS. 5-12, respectively, to configure frequency interlaces (e.g., the frequency interlaces 508, 608, 708, 718, 808, 818, 828, 918, 1018, 1118, and 1218) in a network system band or a certain BWP within a network system band. In an embodiment, a BS may employ the schemes 700 and 800 for configuring frequency interlaces with 15 kHz and 30 kHz SCSs and employ the schemes 1200 for configuring frequency interlaces with 30 kHz and 60 kHz SCSs. The BS may schedule one or more frequency interlaces of the same SCS for communicating with a particular UE. The BS may schedule one or more frequency interlaces of one SCS for communicating with a first UE and schedule one or more frequency interlaces of another SCS for communicating with a second UE within the same time period.

Figure 13:
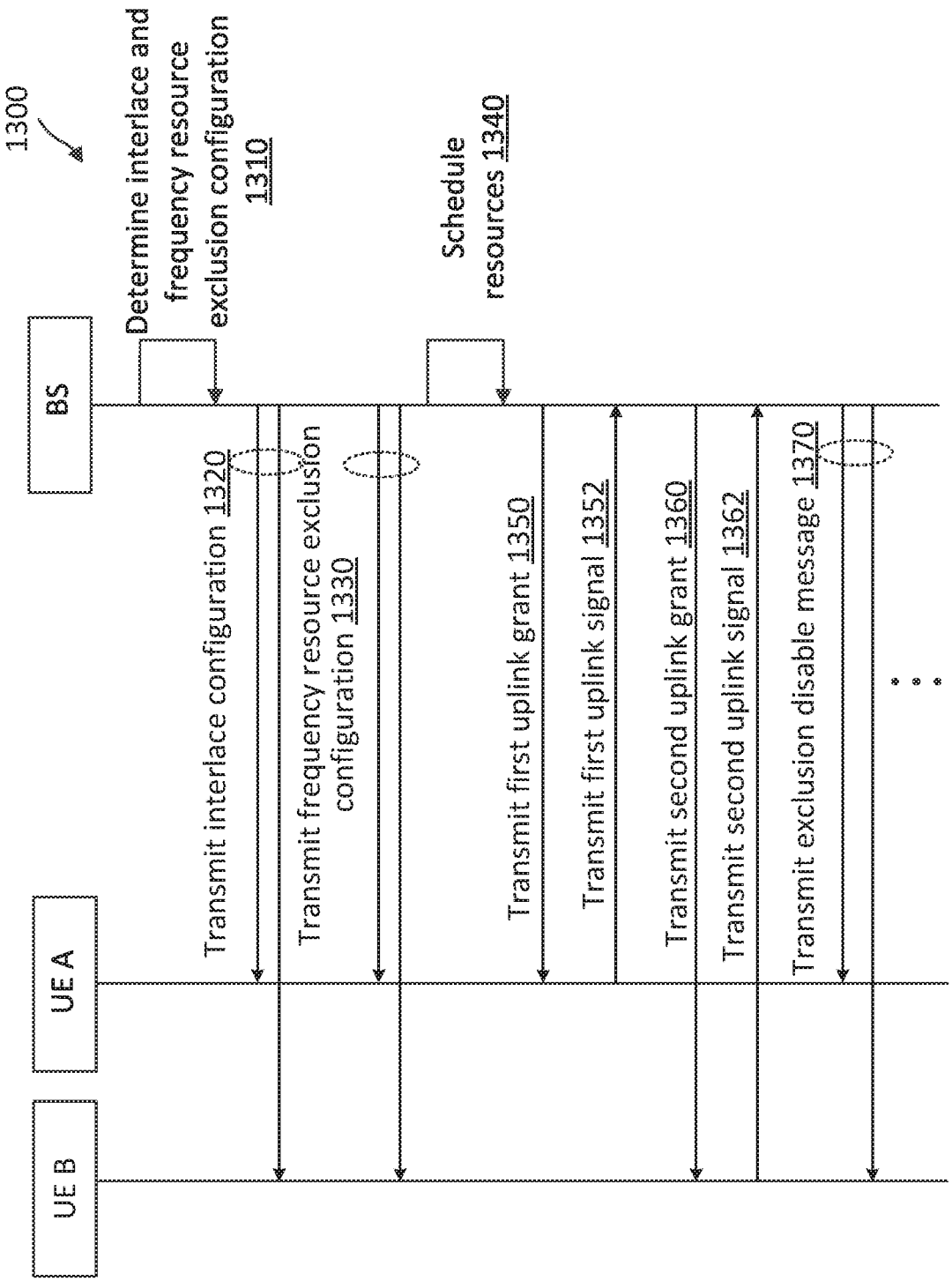
FIG. 13 is a signaling diagram of a frequency interlace-based communication method according to some embodiments of the present disclosure.

FIG. 13 is a signaling diagram of a frequency interlace-based communication method 1300 according to some embodiments of the present disclosure. The method 1300 is implemented by a BS (e.g., the BSs 105 and 400), a UE A and a UE B (e.g., the UEs 115 and 300) in a network (e.g., the network 100). Steps of the method 1300 can be executed by computing devices (e.g., a processor, processing circuit, and/or other suitable component) of the BS and the UE. As illustrated, the method 1300 includes a number of enumerated steps, but embodiments of the method 1300 may include additional steps before, after, and in between the enumerated steps. In some embodiments, one or more of the enumerated steps may be omitted or performed in a different order.

At step 1310, the BS determines an interlace configuration and a frequency resource exclusion configuration. The interlace configurations may be similar to the interlace configurations 506a, 506b, 606, 706, 720, 806, 820, 830, 920, 1020, 1120, and 1220. The interlace configurations may include information such as an interlace-spacing (e.g., the interlace-spacing 504, 604, 704, 804, 914, 1014, 1114, and 1214), a number of frequency interlaces (e.g., M), frequency interlace sizes (e.g., N and N+1), SCSs (e.g., $f_{scs1}$ and $f_{scs2}$), resource offsets (e.g., the offsets 822 and 832), and/or frequency resource bandwidths (e.g., the bandwidth 1202). The frequency resource exclusion configuration may include exclusion rules that are based on a frequency interlace size constraint (e.g., integer multiples of 2, 3, or 5), a uniform frequency distribution pattern constraint, and/or waveform types. For example, the frequency resource exclusion configuration may include different rules for different waveforms (e.g., OFDM and DFT-s-OFDM). The frequency resource exclusion configuration may indicate exclusions from a particular frequency range (e.g., a low-frequency band edge, a high-frequency band edge, or both band edges). The BS may use any suitable combinations of the schemes 500-1200 for the configurations.

At step 1320, the BS transmits the interlace configuration to the UE A and the UE B. At step 1330, the BS transmits the frequency resource exclusion configuration to the UE A and the UE B. The BS may transmit the interlace configuration and the frequency resource exclusion configuration via higher layer signaling (e.g., above a media access control (MAC) layer) or physical layer signaling (e.g., in a physical downlink control channel (PDCCH)). For example, an RRC message may be used for a higher layer signaling or a downlink control information (DCI) message may be used for a physical layer signaling. In some embodiments, the BS may broadcast the interlace configuration and the frequency resource exclusion configuration in the network.

At step 1340, the BS schedules one or more first frequency interlaces for the UE A and one or more second frequency interlaces for the UE B based on the interlace configuration. The BS may exclude resources from first frequency interlaces and/or the second frequency interlaces based on the frequency resource exclusion configuration.

At step 1350, the BS transmits a first UL grant to the UE A. The first UL grant may indicate the one or more first frequency interlaces. At step 1352, the UE A transmits a first UL communication signal based on the first UL grant.

At step 1360, the BS transmits a second UL grant to the UE B. The second UL grant may indicate the one or more second frequency interlaces. At step 1362, the UE B transmits a second UL communication signal based on the second UL grant.

In some embodiments, the BS may schedule both the UE A and the UE B to transmit in the same TTI. In such embodiments, the one or more first frequency interlaces may not overlapped with the one or more second frequency interlaces. In some embodiments, the one or more first frequency interlaces may include a higher SCS than the one or more second frequency interlaces.

At step 1370, the BS transmits an exclusion disable message to the UE A and the UE B to disable the exclusion rules in the frequency resource exclusion configuration. Subsequently, the BS may communicate with the UE A and the UE B disregarding the exclusion rules. The BS may dynamically determine to disable the exclusion rules, for example, based on a network traffic load, a channel condition, and/or a UE capability.

In some embodiments, when a UE receives an allocation including one or more frequency interlaces that fail to meet a certain size constraint (e.g., a certain integer multiple size constraint) or a certain frequency distribution pattern constraint (e.g., a uniform pattern constraint), the UE may disregard the allocation without transmitting using allocation.

Figure 14:
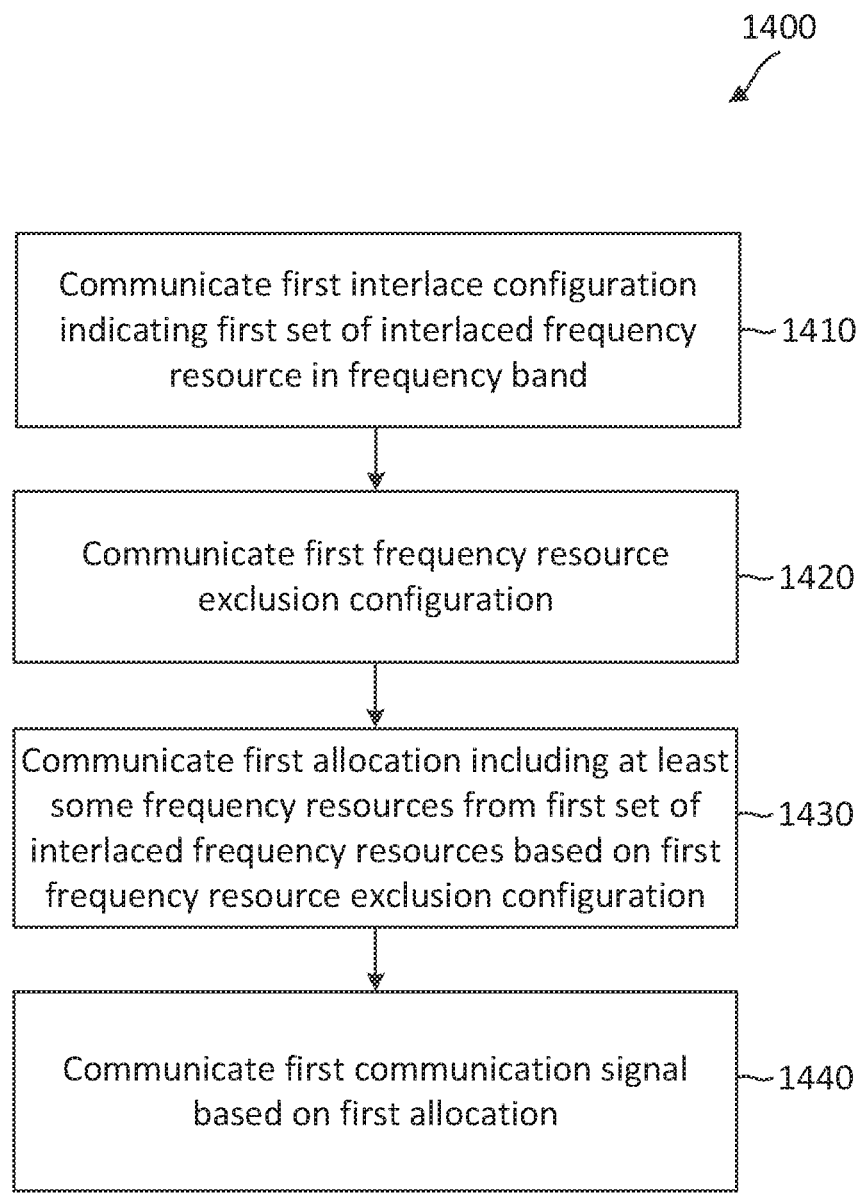
FIG. 14 is a flow diagram of a frequency interlace-based communication method according to embodiments of the present disclosure.

FIG. 14 is a flow diagram of a frequency interlace-based communication method 1400 according to embodiments of the present disclosure. Steps of the method 1400 can be executed by a computing device (e.g., a processor, processing circuit, and/or other suitable component) of a wireless communication device or other suitable means for performing the steps. For example, a wireless communication device, such as the BS 105 or the BS 400, may utilize one or more components, such as the processor 402, the memory 404, the frequency interlace-based communication module 408, the transceiver 410, the modem 412, and the one or more antennas 416, to execute the steps of method 1400. In another example, a wireless communication device, such as the UE 115 or the UE 300, may utilize one or more components, such as the processor 302, the memory 304, the frequency interlace-based communication module 308, the transceiver 310, the modem 312, and the one or more antennas 316, to execute the steps of method 1400. The method 1400 may employ similar mechanisms as in the schemes 500, 600, 700, 800, 900, 1000, 1100, 1200, and/or the method 1300 described with respect to FIGS. 5, 6, 7, 8, 9, 10, 10, 11, 12, and/or 13, respectively. As illustrated, the method 1400 includes a number of enumerated steps, but embodiments of the method 1400 may include additional steps before, after, and in between the enumerated steps. In some embodiments, one or more of the enumerated steps may be omitted or performed in a different order.

At step 1410, the method 1400 includes communicating, by a first wireless communication device with a second wireless communication device, a first interlace configuration indicating a first set of interlaced frequency resources in a frequency band. The first interlace configuration may be similar to the configurations 506a, 506b, 606, 706, 720, 806, 820, 830, 920, 1020, 1120, and 1220. The first set of interlaced frequency resources may be similar to the frequency interlaces 208, 508a, 508b, 608, 708, 718, 808, 818, 828, 918, 1018, 1118, and 1218. The frequency band may be similar to the frequency bands 202, 502, 602, 702, and 802. In one embodiment, the first wireless communication device may correspond to a BS and the second wireless communication device may correspond to a UE. In another embodiment, the first wireless communication device may correspond to a UE and the second wireless communication device may correspond to a BS.

At step 1420, the method 1400 includes communicating, by the first wireless communication device with the second wireless communication device, a first frequency resource exclusion configuration. The exclusion configuration can be dependent on a communication signal waveform, a frequency interlace size constraint, and/or a frequency resource distribution pattern as described herein above.

At step 1430, the method 1400 includes communicating, by the first wireless communication device with the second wireless communication device, a first allocation including at least some frequency resources (e.g., the frequency resources 210, 510, and 710) from the first set of interlaced frequency resources based on the first frequency resource exclusion configuration.

At step 1440, the method 1400 includes communicating, by the first wireless communication device with the second wireless communication device, a first communication signal based on the first allocation.

In an embodiment, the frequency band includes multiple sets of interlaced frequency resources including at least the first set of interlaced frequency resources and a second set of interlaced frequency resources. The first set of interlaced frequency resources and the second set of interlaced frequency resources are non-overlapping. In an embodiment, each set of the multiple sets of interlaced frequency resources may include a same number of interlaced frequency resources, for example, similar to the scheme 500. In an embodiment, the first set of interlaced frequency resources (e.g., the frequency interlace $608_{I(0)}$) may include a different number of interlaced frequency resources than the second set of interlaced frequency resources (e.g., the frequency interlace $608_{I(5)}$), for example, as shown in the scheme 600. In an embodiment, the first allocation may further include the second set of interlaced frequency resources. For example, the first allocation may be similar to the allocations 620 and 630.

In an embodiment, the first wireless communication device may exclude one or more interlaced frequency resources (e.g., the frequency resources 210, 710, or offsets 822 and 832) from the first allocation based on the first frequency resource exclusion configuration. The first wireless communication device may communicate the first communication signal with the second wireless communication device using remaining frequency resources in the first allocation. The exclusion can be based on a size constraint in the first frequency resource exclusion configuration such that the number of remaining interlaced frequency resources is of a predetermined integer multiple (e.g., an integer multiple of 2, 3, or 5). The exclusion can be based on a uniform pattern constraint in the first frequency resource exclusion configuration such that the remaining interlaced frequency resources include a uniform frequency distribution pattern.

In some embodiments, the first wireless communication device may determine whether the first communication signal includes a first waveform type associated with a first rule in the first frequency resource exclusion configuration or a second waveform type associated with a second rule in the first frequency resource exclusion configuration. The exclusion may be based on the first rule when determining that the first communication signal includes the first waveform type.

In some embodiments, the first wireless communication device may communicate a second interlace configuration indicating a second set of interlaced frequency resources in the frequency band with a third wireless communication device. The first wireless communication device may communicate a second frequency resource exclusion configuration with the third wireless communication device. The first wireless communication device may communicate a second allocation with the third wireless communication device. The second allocation may include at least some frequency resources from the second set of interlaced frequency resources based on the second frequency resource exclusion configuration. The first wireless communication device may communicate a second communication signal with the third wireless communication device based on the second resource allocation. The first set of interlaced frequency resources may include a first SCS (e.g., $f_{scs1}$). The second set of interlaced frequency resources may include a second SCS (e.g., $f_{scs1}$) greater than the first SCS.

In an embodiment, the second set of interlaced frequency resources may have a greater SCS than the first set of interlaced frequency resource. A frequency resource (e.g., the interlaced frequency resource 210) in the first set of interlaced frequency resources may include a same number of subcarriers (e.g., the subcarriers 212) as a frequency resource (e.g., the interlaced frequency resource 710) in the second set of interlaced frequency resources. The first set of interlaced frequency resources may include a same interlace-spacing (e.g., the interlace-spacing 704 and 804) as the second set of interlaced frequency resources, for example, as shown in the schemes 700 and 800.

In an embodiment, the second set of interlaced frequency resources may have a greater SCS than the first set of interlaced frequency resource. The second set of interlaced frequency resources (e.g., the frequency interlace may be offset from a third set of interlaced frequency resources in the frequency band by the first set of interlaced frequency resources (e.g., the offsets 822 and 832), the third set of interlaced frequency resources including the second subcarrier spacing, for example, as shown in the scheme 800.

In an embodiment, the second set of interlaced frequency resources may have a greater SCS than the first set of interlaced frequency resource. A frequency resource (e.g., the interlaced frequency resource 210) in the first set of interlaced frequency resources may include a same number of subcarriers as a frequency resource (e.g., the interlaced frequency resource 710) in the second set of interlaced frequency resources. The first set of interlaced frequency resources may be spaced apart by a smaller interlace-spacing than the second set of interlaced frequency resources, for example, as shown in the schemes 900 and 1000.

In an embodiment, the second set of interlaced frequency resources may have a greater SCS than the first set of interlaced frequency resource. A frequency resource (e.g., the interlaced frequency resource 210) in the first set of interlaced frequency resources may occupy a same bandwidth (e.g., the bandwidth 1202) as a frequency resource (e.g., the interlaced frequency resource 1210) in the second set of interlaced frequency resources, for example, as shown in the schemes 1200.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

Further embodiments of the present disclosure include a method of wireless communication, comprising communicating, by a first wireless communication device with a second wireless communication device, a first interlace configuration indicating a first set of interlaced frequency resources in a frequency band; communicating, by the first wireless communication device with the second wireless communication device, a first frequency resource exclusion configuration; communicating, by the first wireless communication device with the second wireless communication device, a first allocation including at least some frequency resources from the first set of interlaced frequency resources based on the first frequency resource exclusion configuration; and communicating, by the first wireless communication device with the second wireless communication device, a first communication signal based on the first allocation.

In some embodiments, wherein the frequency band includes multiple sets of interlaced frequency resources including at least: the first set of interlaced frequency resources spaced apart from each other by at least one interlaced frequency resource of another set of the multiple sets of interlaced frequency resources; and a second set of interlaced frequency resources spaced apart from each other by at least one interlaced frequency resource of another set of the multiple sets of interlaced frequency resources, and wherein the first set of interlaced frequency resources and the second set of interlaced frequency resources are non-overlapping. In some embodiments, wherein the first allocation further includes the second set of interlaced frequency resources. In some embodiments, wherein each set of the multiple sets of interlaced frequency resources includes a same number of interlaced frequency resources. In some embodiments, wherein the first set of interlaced frequency resources includes a different number of interlaced frequency resources than the second set of interlaced frequency resources. In some embodiments, the method further comprises excluding, by the first wireless communication device, one or more interlaced frequency resources from the first allocation based on the first frequency resource exclusion configuration, wherein the first communication signal is communicated using remaining frequency resources in the first allocation. In some embodiments, wherein the excluding includes excluding the one or more interlaced frequency resources such that a number of remaining frequency resources in the first allocation is of a predetermined integer multiple based on the first frequency resource exclusion configuration. In some embodiments, wherein the excluding includes excluding the one or more interlaced frequency resources such that remaining interlaced frequency resources in the first allocation are spaced apart in the frequency band in a uniform pattern based on the first frequency resource exclusion configuration. In some embodiments, the method further comprises determining, by the first wireless communication device, whether the first communication signal includes a first waveform type associated with a first rule in the first frequency resource exclusion configuration or a second waveform type associated with a second rule in the first frequency resource exclusion configuration. wherein the excluding is based on the first rule when determining that the first communication signal includes the first waveform type. In some embodiments, the method further comprises communicating, by the first wireless communication device with a third wireless communication device, a second interlace configuration indicating a second set of interlaced frequency resources in the frequency band; communicating, by the first wireless communication device with the third wireless communication device, a second frequency resource exclusion configuration; communicating, by the first wireless communication device with the third wireless communication device, a second resource allocation including at least some frequency resources from the second set of interlaced frequency resources based on the second frequency resource exclusion configuration; and communicating, by the first wireless communication device with the third wireless communication device, a second communication signal based on the second resource allocation, wherein the first set of interlaced frequency resources includes a first subcarrier spacing, and wherein the second set of interlaced frequency resources includes a second subcarrier spacing greater than the first subcarrier spacing. In some embodiments, wherein a frequency resource in the first set of interlaced frequency resources includes a same number of subcarriers as a frequency resource in the second set of interlaced frequency resources, and wherein the first set of interlaced frequency resources includes a same interlace-spacing as the second set of interlaced frequency resources. In some embodiments, wherein the second set of interlaced frequency resources is offset from a third set of interlaced frequency resources in the frequency band by the first set of interlaced frequency resources, the third set of interlaced frequency resources including the second subcarrier spacing. In some embodiments, wherein a frequency resource in the first set of interlaced frequency resources includes a same number of subcarriers as a frequency resource in the second set of interlaced frequency resources, and wherein the first set of interlaced frequency resources are spaced apart by a smaller interlace-spacing than the second set of interlaced frequency resources. In some embodiments, wherein a frequency resource in the first set of interlaced frequency resources occupies a same bandwidth as a frequency resource in the second set of interlaced frequency resources. In some embodiments, the method further comprises communicating, by the first wireless communication device with the second wireless communication device, a message disabling the first frequency resource exclusion configuration; communicating, by the first wireless communication device with the second wireless communication device, a second allocation disregarding the first frequency resource exclusion configuration; and communicating, by the first wireless communication device with the second wireless communication device, a second communication signal based on the second allocation. In some embodiments, wherein the at least one of the first interlace configuration or the first frequency resource exclusion configuration is communicated via a radio resource configuration (RRC) message or downlink control information (DCI).

Further embodiments of the present disclosure include an apparatus comprising a transceiver configured to communicate, with a second wireless communication device, a first interlace configuration indicating a first set of interlaced frequency resources in a frequency band; communicate, with the second wireless communication device, a first frequency resource exclusion configuration; communicate, with the second wireless communication device, a first allocation including at least some frequency resources from the first set of interlaced frequency resources based on the first frequency resource exclusion configuration; and communicate, with the second wireless communication device, a first communication signal based on the first allocation.

In some embodiments, wherein the frequency band includes multiple sets of interlaced frequency resources including at least the first set of interlaced frequency resources spaced apart from each other by at least one interlaced frequency resource of another set of the multiple sets of interlaced frequency resources; and a second set of interlaced frequency resources spaced apart from each other by at least one interlaced frequency resource of another set of the multiple sets of interlaced frequency resources, and wherein the first set of interlaced frequency resources and the second set of interlaced frequency resources are non-overlapping. In some embodiments, wherein the first allocation further includes the second set of interlaced frequency resources. In some embodiments, wherein each set of the multiple sets of interlaced frequency resources includes a same number of interlaced frequency resources. In some embodiments, wherein the first set of interlaced frequency resources includes a different number of interlaced frequency resources than the second set of interlaced frequency resources. In some embodiments, the apparatus further comprises a processor configured to exclude one or more interlaced frequency resources from the first allocation based on the first frequency resource exclusion configuration, wherein the first communication signal is communicated using remaining frequency resources in the first allocation. In some embodiments, wherein the processor is further configured to exclude the one or more interlaced frequency resources from the first allocation by excluding the one or more interlaced frequency resources such that a number of remaining frequency resources in the first allocation is of a predetermined integer multiple based on the first frequency resource exclusion configuration. In some embodiments, wherein the processor is further configured to exclude the one or more interlaced frequency resources from the first allocation by excluding the one or more interlaced frequency resources such that remaining interlaced frequency resources in the first allocation are spaced apart in the frequency band in a uniform pattern based on the first frequency resource exclusion configuration. In some embodiments, wherein the processor is further configured to determine whether the first communication signal includes a first waveform type associated with a first rule in the first frequency resource exclusion configuration or a second waveform type associated with a second rule in the first frequency resource exclusion configuration, wherein the one or more interlaced frequency resources from the first allocation are excluded based on the first rule when determining that the first communication signal includes the first waveform type. In some embodiments, wherein the transceiver is further configured to communicate, with a third wireless communication device, a second interlace configuration indicating a second set of interlaced frequency resources in the frequency band; communicate, with the third wireless communication device, a second frequency resource exclusion configuration; communicate, with the third wireless communication device, a second resource allocation including at least some frequency resources from the second set of interlaced frequency resources based on the second frequency resource exclusion configuration; and communicate, with the third wireless communication device, a second communication signal based on the second resource allocation, wherein the first set of interlaced frequency resources includes a first subcarrier spacing, and wherein the second set of interlaced frequency resources includes a second subcarrier spacing greater than the first subcarrier spacing. In some embodiments, wherein a frequency resource in the first set of interlaced frequency resources includes a same number of subcarriers as a frequency resource in the second set of interlaced frequency resources, and wherein the first set of interlaced frequency resources includes a same interlace-spacing as the second set of interlaced frequency resources. In some embodiments, wherein the second set of interlaced frequency resources is offset from a third set of interlaced frequency resources in the frequency band by the first set of interlaced frequency resources, the third set of interlaced frequency resources including the second subcarrier spacing. In some embodiments, wherein a frequency resource in the first set of interlaced frequency resources includes a same number of subcarriers as a frequency resource in the second set of interlaced frequency resources, and wherein the first set of interlaced frequency resources are spaced apart by a smaller interlace-spacing than the second set of interlaced frequency resources. In some embodiments, wherein a frequency resource in the first set of interlaced frequency resources occupies a same bandwidth as a frequency resource in the second set of interlaced frequency resources. In some embodiments, wherein the transceiver is further configured to communicate, with the second wireless communication device, a message disabling the first frequency resource exclusion configuration; communicate, with the second wireless communication device, a second allocation disregarding the first frequency resource exclusion configuration; and communicate, with the second wireless communication device, a second communication signal based on the second allocation. In some embodiments, wherein the at least one of the first interlace configuration or the first frequency resource exclusion configuration is communicated via a radio resource configuration (RRC) message or downlink control information (DCI).

Further embodiments of the present disclosure include a computer-readable medium having program code recorded thereon, the program code comprising code for causing a first wireless communication device to communicate, with a second wireless communication device, a first interlace configuration indicating a first set of interlaced frequency resources in a frequency band; code for causing the first wireless communication device to communicate, with the second wireless communication device, a first frequency resource exclusion configuration; code for causing the first wireless communication device to communicate, with the second wireless communication device, a first allocation including at least some frequency resources from the first set of interlaced frequency resources based on the first frequency resource exclusion configuration; and code for causing the first wireless communication device to communicate, with the second wireless communication device, a first communication signal based on the first allocation.

In some embodiments, wherein the frequency band includes multiple sets of interlaced frequency resources including at least the first set of interlaced frequency resources spaced apart from each other by at least one interlaced frequency resource of another set of the multiple sets of interlaced frequency resources; and a second set of interlaced frequency resources spaced apart from each other by at least one interlaced frequency resource of another set of the multiple sets of interlaced frequency resources, and wherein the first set of interlaced frequency resources and the second set of interlaced frequency resources are non-overlapping. In some embodiments, wherein the first allocation further includes the second set of interlaced frequency resources. In some embodiments, wherein each set of the multiple sets of interlaced frequency resources includes a same number of interlaced frequency resources. In some embodiments, wherein the first set of interlaced frequency resources includes a different number of interlaced frequency resources than the second set of interlaced frequency resources. In some embodiments, the computer-readable medium further comprises code for causing the first wireless communication device to exclude one or more interlaced frequency resources from the first allocation based on the first frequency resource exclusion configuration, wherein the first communication signal is communicated using remaining frequency resources in the first allocation. In some embodiments, wherein the code for causing the first wireless communication device to exclude the one or more interlaced frequency resources from the first allocation is further configured to exclude the one or more interlaced frequency resources such that a number of remaining frequency resources in the first allocation is of a predetermined integer multiple based on the first frequency resource exclusion configuration. In some embodiments, wherein the code for causing the first wireless communication device to exclude the one or more interlaced frequency resources from the first allocation is further configured to exclude the one or more interlaced frequency resources such that remaining interlaced frequency resources in the first allocation are spaced apart in the frequency band in a uniform pattern based on the first frequency resource exclusion configuration. In some embodiments, the computer-readable medium further comprises code for causing the first wireless communication device to determine whether the first communication signal includes a first waveform type associated with a first rule in the first frequency resource exclusion configuration or a second waveform type associated with a second rule in the first frequency resource exclusion configuration, wherein the one or more interlaced frequency resources from the first allocation are excluded based on the first rule when determining that the first communication signal includes the first waveform type. In some embodiments, the computer-readable medium further comprises code for causing the first wireless communication device to communicate, with a third wireless communication device, a second interlace configuration indicating a second set of interlaced frequency resources in the frequency band; code for causing the first wireless communication device to communicate, with the third wireless communication device, a second frequency resource exclusion configuration; code for causing the first wireless communication device to communicate, with the third wireless communication device, a second resource allocation including at least some frequency resources from the second set of interlaced frequency resources based on the second frequency resource exclusion configuration; and code for causing the first wireless communication device to communicate, with the third wireless communication device, a second communication signal based on the second resource allocation, wherein the first set of interlaced frequency resources includes a first subcarrier spacing, and wherein the second set of interlaced frequency resources includes a second subcarrier spacing greater than the first subcarrier spacing. In some embodiments, wherein a frequency resource in the first set of interlaced frequency resources includes a same number of subcarriers as a frequency resource in the second set of interlaced frequency resources, and wherein the first set of interlaced frequency resources includes a same interlace-spacing as the second set of interlaced frequency resources. In some embodiments, wherein the second set of interlaced frequency resources is offset from a third set of interlaced frequency resources in the frequency band by the first set of interlaced frequency resources, the third set of interlaced frequency resources including the second subcarrier spacing. In some embodiments, wherein a frequency resource in the first set of interlaced frequency resources includes a same number of subcarriers as a frequency resource in the second set of interlaced frequency resources, and wherein the first set of interlaced frequency resources are spaced apart by a smaller interlace-spacing than the second set of interlaced frequency resources. In some embodiments, wherein a frequency resource in the first set of interlaced frequency resources occupies a same bandwidth as a frequency resource in the second set of interlaced frequency resources. In some embodiments, the computer-readable medium further comprises code for causing the first wireless communication device to communicate, with the second wireless communication device, a message disabling the first frequency resource exclusion configuration; code for causing the first wireless communication device to communicate, with the second wireless communication device, a second allocation disregarding the first frequency resource exclusion configuration; and code for causing the first wireless communication device to communicate, with the second wireless communication device, a second communication signal based on the second allocation. In some embodiments, wherein the at least one of the first interlace configuration or the first frequency resource exclusion configuration is communicated via a radio resource configuration (RRC) message or downlink control information (DCI).

Further embodiments of the present disclosure include an apparatus comprising means for communicating, with a second wireless communication device, a first interlace configuration indicating a first set of interlaced frequency resources in a frequency band; means for communicating, with the second wireless communication device, a first frequency resource exclusion configuration; means for communicating, with the second wireless communication device, a first allocation including at least some frequency resources from the first set of interlaced frequency resources based on the first frequency resource exclusion configuration; and means for communicating, with the second wireless communication device, a first communication signal based on the first allocation.

In some embodiments, wherein the frequency band includes multiple sets of interlaced frequency resources including at least the first set of interlaced frequency resources spaced apart from each other by at least one interlaced frequency resource of another set of the multiple sets of interlaced frequency resources; and a second set of interlaced frequency resources spaced apart from each other by at least one interlaced frequency resource of another set of the multiple sets of interlaced frequency resources, and wherein the first set of interlaced frequency resources and the second set of interlaced frequency resources are non-overlapping. In some embodiments, wherein the first allocation further includes the second set of interlaced frequency resources. In some embodiments, wherein each set of the multiple sets of interlaced frequency resources includes a same number of interlaced frequency resources. In some embodiments, wherein the first set of interlaced frequency resources includes a different number of interlaced frequency resources than the second set of interlaced frequency resources. In some embodiments, the apparatus further comprises means for excluding one or more interlaced frequency resources from the first allocation based on the first frequency resource exclusion configuration, wherein the first communication signal is communicated using remaining frequency resources in the first allocation. In some embodiments, wherein the means for excluding the one or more interlaced frequency resources from the first allocation is further configured to exclude the one or more interlaced frequency resources such that a number of remaining frequency resources in the first allocation is of a predetermined integer multiple based on the first frequency resource exclusion configuration. In some embodiments, wherein the means for excluding the one or more interlaced frequency resources from the first allocation is further configured to exclude the one or more interlaced frequency resources such that remaining interlaced frequency resources in the first allocation are spaced apart in the frequency band in a uniform pattern based on the first frequency resource exclusion configuration. In some embodiments, the apparatus further comprises means for determining whether the first communication signal includes a first waveform type associated with a first rule in the first frequency resource exclusion configuration or a second waveform type associated with a second rule in the first frequency resource exclusion configuration, wherein the one or more interlaced frequency resources from the first allocation are excluded based on the first rule when determining that the first communication signal includes the first waveform type. In some embodiments, the apparatus further comprises means for communicating, with a third wireless communication device, a second interlace configuration indicating a second set of interlaced frequency resources in the frequency band; means for communicating, with the third wireless communication device, a second frequency resource exclusion configuration; means for communicating, with the third wireless communication device, a second resource allocation including at least some frequency resources from the second set of interlaced frequency resources based on the second frequency resource exclusion configuration; and means for communicating, with the third wireless communication device, a second communication signal based on the second resource allocation, wherein the first set of interlaced frequency resources includes a first subcarrier spacing, and wherein the second set of interlaced frequency resources includes a second subcarrier spacing greater than the first subcarrier spacing. In some embodiments, wherein a frequency resource in the first set of interlaced frequency resources includes a same number of subcarriers as a frequency resource in the second set of interlaced frequency resources, and wherein the first set of interlaced frequency resources includes a same interlace-spacing as the second set of interlaced frequency resources. In some embodiments, wherein the second set of interlaced frequency resources is offset from a third set of interlaced frequency resources in the frequency band by the first set of interlaced frequency resources, the third set of interlaced frequency resources including the second subcarrier spacing. In some embodiments, wherein a frequency resource in the first set of interlaced frequency resources includes a same number of subcarriers as a frequency resource in the second set of interlaced frequency resources, and wherein the first set of interlaced frequency resources are spaced apart by a smaller interlace-spacing than the second set of interlaced frequency resources. In some embodiments, wherein a frequency resource in the first set of interlaced frequency resources occupies a same bandwidth as a frequency resource in the second set of interlaced frequency resources. In some embodiments, the apparatus further comprises means for communicating, with the second wireless communication device, a message disabling the first frequency resource exclusion configuration; means for communicating, with the second wireless communication device, a second allocation disregarding the first frequency resource exclusion configuration; and means for communicating, with the second wireless communication device, a second communication signal based on the second allocation. In some embodiments, wherein the at least one of the first interlace configuration or the first frequency resource exclusion configuration is communicated via a radio resource configuration (RRC) message or downlink control information (DCI).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication, comprising:
    communicating, by a first wireless communication device with a second wireless communication device, a first interlace configuration indicating a first set of interlaced frequency resources in a frequency band based on a power spectral density (PSD) parameter, wherein the first set of interlaced frequency resources includes a predetermined number of frequency resources based on a subcarrier spacing of the first set of interlaced frequency resources;
    communicating, by the first wireless communication device with the second wireless communication device, a first frequency resource exclusion configuration;
    communicating, by the first wireless communication device with the second wireless communication device, a first allocation including a plurality of frequency resources from the first set of interlaced frequency resources based on the first frequency resource exclusion configuration;
    excluding, by the first wireless communication device, one or more interlaced frequency resources from the first allocation based on the first frequency resource exclusion configuration such that a number of remaining frequency resources in the first allocation is of a predetermined integer multiple based on the first frequency resource exclusion configuration; and
    communicating, by the first wireless communication device with the second wireless communication device, a first communication signal based on the first allocation using the remaining frequency resources in the first allocation.

2. The method of claim 1, wherein the frequency band includes multiple sets of interlaced frequency resources including at least:
    the first set of interlaced frequency resources spaced apart from each other by at least one interlaced frequency resource of a third set of the multiple sets of interlaced frequency resources; and
    a second set of interlaced frequency resources spaced apart from each other by at least one interlaced frequency resource of a fourth set of the multiple sets of interlaced frequency resources,
    wherein the first set of interlaced frequency resources and the second set of interlaced frequency resources are non-overlapping, and
    wherein the first allocation further includes the second set of interlaced frequency resources.

3. The method of claim 2, wherein each set of the multiple sets of interlaced frequency resources includes a same number of interlaced frequency resources.

4. The method of claim 2, wherein the first set of interlaced frequency resources includes a different number of interlaced frequency resources than the second set of interlaced frequency resources.

5. The method of claim 1, further comprising wherein:
    the remaining interlaced frequency resources in the first allocation are spaced apart in the frequency band in a uniform pattern based on the first frequency resource exclusion configuration.

6. The method of claim 1, further comprising:
    determining, by the first wireless communication device, whether the first communication signal includes a first waveform type associated with a first rule in the first frequency resource exclusion configuration or a second waveform type associated with a second rule in the first frequency resource exclusion configuration, wherein:
    the excluding the one or more interlaced frequency resources includes excluding the one or more interlaced frequency resources from the first allocation in response to determining that the first communication signal includes the first waveform type.

7. The method of claim 1, further comprising:
    communicating, by the first wireless communication device with a third wireless communication device, a second interlace configuration indicating a second set of interlaced frequency resources in the frequency band;
    communicating, by the first wireless communication device with the third wireless communication device, a second frequency resource exclusion configuration;
    communicating, by the first wireless communication device with the third wireless communication device, a second resource allocation including at least some frequency resources from the second set of interlaced frequency resources based on the second frequency resource exclusion configuration; and communicating, by the first wireless communication device with the third wireless communication device, a second communication signal based on the second resource allocation,
wherein the first set of interlaced frequency resources includes a first subcarrier spacing, and
wherein the second set of interlaced frequency resources includes a second subcarrier spacing greater than the first subcarrier spacing.

8. The method of claim 7, wherein a frequency resource in the first set of interlaced frequency resources includes a same number of subcarriers as a frequency resource in the second set of interlaced frequency resources, and wherein the first set of interlaced frequency resources includes a same interlace-spacing as the second set of interlaced frequency resources.

9. The method of claim 7, wherein the second frequency resource exclusion configuration indicates that the second set of interlaced frequency resources is offset from a third set of interlaced frequency resources in the frequency band by the first set of interlaced frequency resources, the third set of interlaced frequency resources including the second subcarrier spacing.

10. The method of claim 7, wherein the second frequency resource exclusion configuration indicates that a frequency resource in the first set of interlaced frequency resources includes a same number of subcarriers as a frequency resource in the second set of interlaced frequency resources, and wherein the first set of interlaced frequency resources are spaced apart by a smaller interlace-spacing than the second set of interlaced frequency resources.

11. The method of claim 7, wherein a frequency resource in the first set of interlaced frequency resources occupies a same bandwidth as a frequency resource in the second set of interlaced frequency resources.

12. The method of claim 1, further comprising:
communicating, by the first wireless communication device with the second wireless communication device, a message disabling the first frequency resource exclusion configuration;
communicating, by the first wireless communication device with the second wireless communication device, a second allocation disregarding the first frequency resource exclusion configuration; and
communicating, by the first wireless communication device with the second wireless communication device, a second communication signal based on the second allocation.

13. The method of claim 1, wherein the at least one of the first interlace configuration or the first frequency resource exclusion configuration is communicated via a radio resource control (RRC) message or downlink control information (DCI).

14. An apparatus comprising:
a transceiver configured to:
communicate, with a second wireless communication device, a first interlace configuration indicating a first set of interlaced frequency resources in a frequency band based on a power spectral density (PSD) parameter, wherein the first set of interlaced frequency resources includes a predetermined number of frequency resources based on a subcarrier spacing of the first set of interlaced frequency resources;
communicate, with the second wireless communication device, a first frequency resource exclusion configuration;
communicate, with the second wireless communication device, a first allocation including a plurality of frequency resources from the first set of interlaced frequency resources based on the first frequency resource exclusion configuration; and
a processor configured to:
exclude one or more interlaced frequency resources from the first allocation based on the first frequency resource exclusion configuration such that a number of remaining frequency resources in the first allocation is of a predetermined integer multiple based on the first frequency resource exclusion configuration,
wherein the processor is further configured to: communicate, with the second wireless communication device, a first communication signal based on the first allocation using the remaining frequency resources in the first allocation.

15. The apparatus of claim 14, wherein the frequency band includes multiple sets of interlaced frequency resources including at least:
the first set of interlaced frequency resources spaced apart from each other by at least one interlaced frequency resource of a third set of the multiple sets of interlaced frequency resources; and
a second set of interlaced frequency resources spaced apart from each other by at least one interlaced frequency resource of a fourth set of the multiple sets of interlaced frequency resources,
wherein the first set of interlaced frequency resources and the second set of interlaced frequency resources are non-overlapping, and
wherein the first allocation further includes the second set of interlaced frequency resources.

16. The apparatus of claim 14, wherein:
the remaining interlaced frequency resources in the first allocation are spaced apart in the frequency band in a uniform pattern based on the first frequency resource exclusion configuration.

17. The apparatus of claim 14, wherein:
the processor is further configured to:
determine whether the first communication signal includes a first waveform type associated with a first rule in the first frequency resource exclusion configuration or a second waveform type associated with a second rule in the first frequency resource exclusion configuration; and
exclude the one or more interlaced frequency resources from the first allocation in response to determining that the first communication signal includes the first waveform type.

18. The apparatus of claim 14, wherein the transceiver is further configured to:
communicate, with a third wireless communication device, a second interlace configuration indicating a second set of interlaced frequency resources in the frequency band;
communicate, with the third wireless communication device, a second frequency resource exclusion configuration;
communicate, with the third wireless communication device, a second resource allocation including at least some frequency resources from the second set of interlaced frequency resources based on the second frequency resource exclusion configuration; and
communicate, with the third wireless communication device, a second communication signal based on the second resource allocation, wherein the first set of interlaced frequency resources includes a first subcarrier spacing, and
wherein the second set of interlaced frequency resources includes a second subcarrier spacing greater than the first subcarrier spacing.

19. The apparatus of claim 18, wherein the second frequency resource exclusion configuration indicates that a frequency resource in the first set of interlaced frequency resources includes a same number of subcarriers as a frequency resource in the second set of interlaced frequency resources, and wherein the first set of interlaced frequency resources includes a same interlace-spacing as the second set of interlaced frequency resources.

20. The apparatus of claim 18, wherein the second frequency resource exclusion configuration indicates that the second set of interlaced frequency resources is offset from a third set of interlaced frequency resources in the frequency band by the first set of interlaced frequency resources, the third set of interlaced frequency resources including the second subcarrier spacing.

21. The apparatus of claim 18, wherein a frequency resource in the first set of interlaced frequency resources includes a same number of subcarriers as a frequency resource in the second set of interlaced frequency resources, and wherein the first set of interlaced frequency resources are spaced apart by a smaller interlace-spacing than the second set of interlaced frequency resources.

22. A non-transitory computer-readable medium having program code recorded thereon, the program code comprising:
    code for causing a first wireless communication device to communicate, with a second wireless communication device, a first interlace configuration indicating a first set of interlaced frequency resources in a frequency band based on a power spectral density (PSD) parameter, wherein the first set of interlaced frequency resources includes a predetermined number of frequency resources based on a subcarrier spacing of the first set of interlaced frequency resources;
    code for causing the first wireless communication device to communicate, with the second wireless communication device, a first frequency resource exclusion configuration;
    code for causing the first wireless communication device to communicate, with the second wireless communication device, a first allocation including a plurality of frequency resources from the first set of interlaced frequency resources based on the first frequency resource exclusion configuration;
    code for causing the first wireless communication device to exclude, by the first wireless communication device, one or more interlaced frequency resources from the first allocation based on the first frequency resource exclusion configuration such that a number of remaining frequency resources in the first allocation is of a predetermined integer multiple based on the first frequency resource exclusion configuration; and
    code for causing the first wireless communication device to communicate, with the second wireless communication device, a first communication signal based on the first allocation using the remaining frequency resources in the first allocation.

23. The non-transitory computer-readable medium of claim 22, wherein the frequency band includes multiple sets of interlaced frequency resources including at least:
    the first set of interlaced frequency resources spaced apart from each other by at least one interlaced frequency resource of a third set of the multiple sets of interlaced frequency resources; and
    a second set of interlaced frequency resources spaced apart from each other by at least one interlaced frequency resource of a fourth set of the multiple sets of interlaced frequency resources,
    wherein the first set of interlaced frequency resources and the second set of interlaced frequency resources are non-overlapping, and
    wherein the first allocation further includes the second set of interlaced frequency resources.

24. The non-transitory computer-readable medium of claim 22, wherein:
    the remaining interlaced frequency resources in the first allocation are spaced apart in the frequency band in a uniform pattern based on the first frequency resource exclusion configuration.

25. The non-transitory computer-readable medium of claim 22, further comprising:
    code for causing the first wireless communication device to determine whether the first communication signal includes a first waveform type associated with a first rule in the first frequency resource exclusion configuration or a second waveform type associated with a second rule in the first frequency resource exclusion configuration; and
    code for causing the first wireless communication device to exclude the one or more interlaced frequency resources from the first allocation in response to determining that the first communication signal includes the first waveform type.

26. The non-transitory computer-readable medium of claim 22, further comprising:
    code for causing the first wireless communication device to communicate, with a third wireless communication device, a second interlace configuration indicating a second set of interlaced frequency resources in the frequency band;
    code for causing the first wireless communication device to communicate, with the third wireless communication device, a second frequency resource exclusion configuration;
    code for causing the first wireless communication device to communicate, with the third wireless communication device, a second resource allocation including at least some frequency resources from the second set of interlaced frequency resources based on the second frequency resource exclusion configuration; and
    code for causing the first wireless communication device to communicate, with the third wireless communication device, a second communication signal based on the second resource allocation,
    wherein the first set of interlaced frequency resources includes a first subcarrier spacing, and
    wherein the second set of interlaced frequency resources includes a second subcarrier spacing greater than the first subcarrier spacing.

27. The non-transitory computer-readable medium of claim 26, wherein the second frequency resource exclusion configuration indicates that a frequency resource in the first set of interlaced frequency resources includes a same number of subcarriers as a frequency resource in the second set of interlaced frequency resources, and wherein the first set of interlaced frequency resources includes a same interlace-spacing as the second set of interlaced frequency resources.

28. The non-transitory computer-readable medium of claim 26, wherein the second frequency resource exclusion configuration indicates that the second set of interlaced frequency resources is offset from a third set of interlaced frequency resources in the frequency band by the first set of interlaced frequency resources, the third set of interlaced frequency resources including the second subcarrier spacing.

29. The non-transitory computer-readable medium of claim 26, wherein a frequency resource in the first set of interlaced frequency resources includes a same number of subcarriers as a frequency resource in the second set of interlaced frequency resources, and wherein the first set of interlaced frequency resources are spaced apart by a smaller interlace-spacing than the second set of interlaced frequency resources.

30. The apparatus of claim 14, wherein the at least one of the first interlace configuration or the first frequency resource exclusion configuration is communicated via a radio resource control (RRC) message or downlink control information (DCI).

* * * * *